US007085942B2

(12) United States Patent
Kopley et al.

(10) Patent No.: US 7,085,942 B2
(45) Date of Patent: Aug. 1, 2006

(54) METHOD AND APPARATUS FOR DEFINING AN INPUT STATE VECTOR THAT ACHIEVES LOW POWER CONSUMPTION IN A DIGITAL CIRCUIT IN AN IDLE STATE

(75) Inventors: Thomas E. Kopley, La Honda, CA (US); Vamsi K. Srikantam, Sunnyvale, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 454 days.

(21) Appl. No.: 10/443,555

(22) Filed: May 21, 2003

(65) Prior Publication Data
US 2004/0236971 A1 Nov. 25, 2004

(51) Int. Cl.
G06F 1/26 (2006.01)
G05F 3/02 (2006.01)
(52) U.S. Cl. .................. 713/300; 713/320; 327/544
(58) Field of Classification Search ............... 713/300, 713/323, 320; 327/538, 544
See application file for complete search history.

(56) References Cited

U.S. PATENT DOCUMENTS

| 188,266 | A | * | 3/1877 | Croce et al. ............ 182/69.3 |
| 5,744,996 | A | * | 4/1998 | Kotzle et al. ............ 327/534 |
| 6,081,135 | A | * | 6/2000 | Goodnow et al. .......... 326/93 |
| 6,144,251 | A | * | 11/2000 | Ogawa .................... 327/544 |
| 6,169,419 | B1 | * | 1/2001 | De et al. .................. 326/58 |
| 6,191,606 | B1 | * | 2/2001 | Ye et al. .................. 326/31 |
| 6,191,615 | B1 | * | 2/2001 | Koga ....................... 326/81 |
| 6,275,083 | B1 | * | 8/2001 | Martinez et al. .......... 327/218 |
| 6,357,013 | B1 | * | 3/2002 | Kelly et al. .............. 713/324 |
| 6,366,152 | B1 | * | 4/2002 | Takeuchi et al. .......... 327/354 |
| 6,466,492 | B1 | * | 10/2002 | Ikeda ...................... 365/195 |
| 6,784,810 | B1 | * | 8/2004 | Falik et al. ............... 341/26 |
| 6,900,666 | B1 | * | 5/2005 | Kursun et al. ............ 326/95 |

OTHER PUBLICATIONS

A Gate-level leakage power reduction method for ultra-low-power CMOS circuits, by Jonathan P. Halter and Farid N. Najm. IEEE 1997 custom integrated circuits conference.*
Estimation of standby leakage power in CMOS circuits considering accurate modeling of transistor stacks, by Zhanping Chen, Mark Johnson, Liqiong Wei, and Kaushik Roy, 1998 ACM.*

* cited by examiner

Primary Examiner—Thomas Lee
Assistant Examiner—Suresh Suryawanshi
(74) Attorney, Agent, or Firm—Ian Hardcastle

(57) ABSTRACT

The method defines an input state vector that achieves low power consumption when applied to the circuit inputs of a digital circuit in an idle state. In the method, independent determinations are performed. Each determination defines a respective set of the input states of the input state vector. Any conflict the definitions of any one or more of the input states is resolved in favor of the definition of the one or more of the input states that achieves the lowest idle power consumption when the input state vector incorporating the one or more of the input states in accordance with the definition is applied to the circuit inputs of the digital circuit in the idle state.

33 Claims, 17 Drawing Sheets

METHOD AND APPARATUS FOR DEFINING AN INPUT STATE VECTOR THAT ACHIEVES LOW POWER CONSUMPTION IN A DIGITAL CIRCUIT IN AN IDLE STATE

RELATED APPLICATION

This application is related to a simultaneously-filed U.S. patent application Ser. No. 10/443,503 entitled Method and Apparatus for Defining an Input State Vector That Achieves Low Power Consumption in a Digital Circuit in an Idle State of inventors Vamsi K. Srikantam and Thomas E. Kopley.

BACKGROUND OF THE INVENTION

The proliferation of low-power applications has driven the need to reduce the power consumption of the circuits used in low-power devices. For example, battery life extension for portable devices, such as cell phones and computers, is of increasing concern as the density and complexity of the circuits used in these devices increases. One solution focuses on lowering the power supply and operating voltages, which requires that the threshold voltages of the transistors used in the circuits be reduced to reach performance guidelines. However, reducing the transistor threshold voltages deleteriously increases the leakage current of the transistors due to the exponential relationship between threshold voltage and leakage current. This becomes more problematic especially as power supply and operating voltages and the corresponding threshold voltages are ever reduced.

Power consumption in devices that are intermittently operated is typically reduced by configuring the circuits of such devices to operate in an idle or standby state after a period of inactivity. Such circuits consume power even in the idle state, however, so it is desirable to reduce the power consumption of the circuits in the idle state. Methods for reducing power consumption in the idle state by defining an input vector have previously been proposed, but such power consumption reduction methods do not take into account the circuit structure of the digital circuit.

In particular, previous methods propose subjecting a circuit to random input state vector generation to obtain an input state vector that, when applied to a digital circuit, results in reduced power consumption when the digital circuit is in an idle state. An example of such a method is disclosed by Halter et al. in *A Gate-Level Leakage Power Reduction Method for Ultra-Low-Power CMOS Circuits*, PROC. IEEE CUSTOM INTEGRATED CIRCUITS CONFERENCE, 475–478 (1997). However, the approach of Halter et al. does not take the circuit structure into account when determining the input state vector. In addition, at least some randomly-generated input state vectors will not actually reduce the power consumption of the digital circuit in the idle state.

Other methods propose applying a genetic algorithm and linear normalization to determine an input state vector. An example of such a method is disclosed by Chen et al. in *Estimation of Standby Leakage Power in CMOS Circuits Considering Accurate Modeling of Transistor Stacks*, PROC. IEEE & ACM INT. SYMPOSIUM ON LOW POWER ELECTRONICS & DESIGN, 239–244(August 1998). However, the final input state vector obtained by the genetic algorithm depends largely on the initial vector set chosen. If the initial vector set is non-optimum, the resulting input state vector may not actually be the input state vector that best reduces the power consumption in the digital circuit in the idle state.

Still other methods reduce power consumption of a digital circuit in an idle state by using multiplexers to apply the input state vector to the inputs of the digital circuit. An example of this is disclosed by U.S. Pat. No. 6,081,135 of Goodnow et al., entitled *Device and Method to Reduce Power Consumption in Integrated Semiconductor Devices*. However, the addition of multiplexers to apply the input state vector increases the power consumption of the digital circuit when the circuit is in its active state. The additional multiplexers also increase the power consumption of the digital circuit in the idle state.

Additionally, when determining an input state vector, it is possible that different approaches for determining an input state vector will generate conflicting state for one or more of the input states of the input state vector.

Therefore, there is a need for a method and apparatus for defining an input state vector that achieves low power consumption when applied to the circuit inputs of a digital circuit in an idle state. Additionally, there is need for a method and apparatus for defining such an input state vector that does not require changes in design methodologies and standard design cell libraries used to design the digital circuit.

SUMMARY OF THE INVENTION

The invention provides an apparatus and method for defining an input state vector that achieves low power consumption when applied to the circuit inputs of a digital circuit in an idle state. Specifically, in one embodiment, the invention provides an apparatus that defines an input state vector that achieves low power consumption when applied to the circuit inputs of a digital circuit in an idle state. The apparatus comprises an input state set defining module and a conflict resolving module. The input state set defining module is operable to perform independent determinations that define respective sets of the input states of the input state vector. The conflict resolving module is operable to resolve any conflict in the definitions by two or more of the determinations of any one or more of the input states in favor of the definition that achieves the lowest idle power consumption when the input state vector incorporating the one or more of the input states in accordance with the definition is applied to the circuit inputs of the digital circuit in the idle state.

In another embodiment, the invention provides a method for defining an input state vector that achieves low power consumption when applied to the circuit inputs of a digital circuit in an idle state. In the method, independent determinations are performed. Each determination defines a respective set of the input states of the input state vector. Any conflict the definitions by two or more of the determinations of any one or more of the input states is resolved in favor of the definition of the one or more of the input states that achieves the lowest idle power consumption when the input state vector is applied to the circuit inputs of the digital circuit in the idle state.

In another embodiment, the invention provides a computer-readable medium on which are stored computer-readable instructions for causing a computer to perform a method for defining an input state vector for application to the circuit inputs of a digital circuit to achieve low power consumption when the digital circuit is in an idle state. In the method, independent determinations are performed. Each determination defines a respective set of the input states of the input state vector. Any conflict in the definitions by two or more of the determinations of any one or more of the input states is resolved in favor of the definition of the one or more of the input states that achieves the lowest idle power consumption when the input state vector that incorporates the one or more of the input states in accordance with the definition is applied to the circuit inputs of the digital circuit in the idle state.

Accordingly, embodiments in accordance with the invention determine an input state vector that achieves low power consumption when applied to the circuit inputs of the digital circuit in an idle state. Embodiments in accordance with the invention additionally determine such an input state vector without requiring a change in design methodologies or standard design cell libraries used in the digital circuit. Embodiments in accordance with the invention determine such an input state vector using characterizations of the circuit elements of the digital circuit under real, dynamic operating conditions. Embodiments in accordance with the invention perform independent determinations each of which defines a set of the input states of the input state vector taking into account the structure and logic constraints of the segment of the digital circuit to which the determination is applied. However, the determination does not take account of the input states defined by other determinations. Embodiments in accordance with the invention resolve any conflicts in the definitions of the input states that arise as a result of the independence of the determinations.

DETAILED DESCRIPTION OF THE INVENTION

Figure 1:
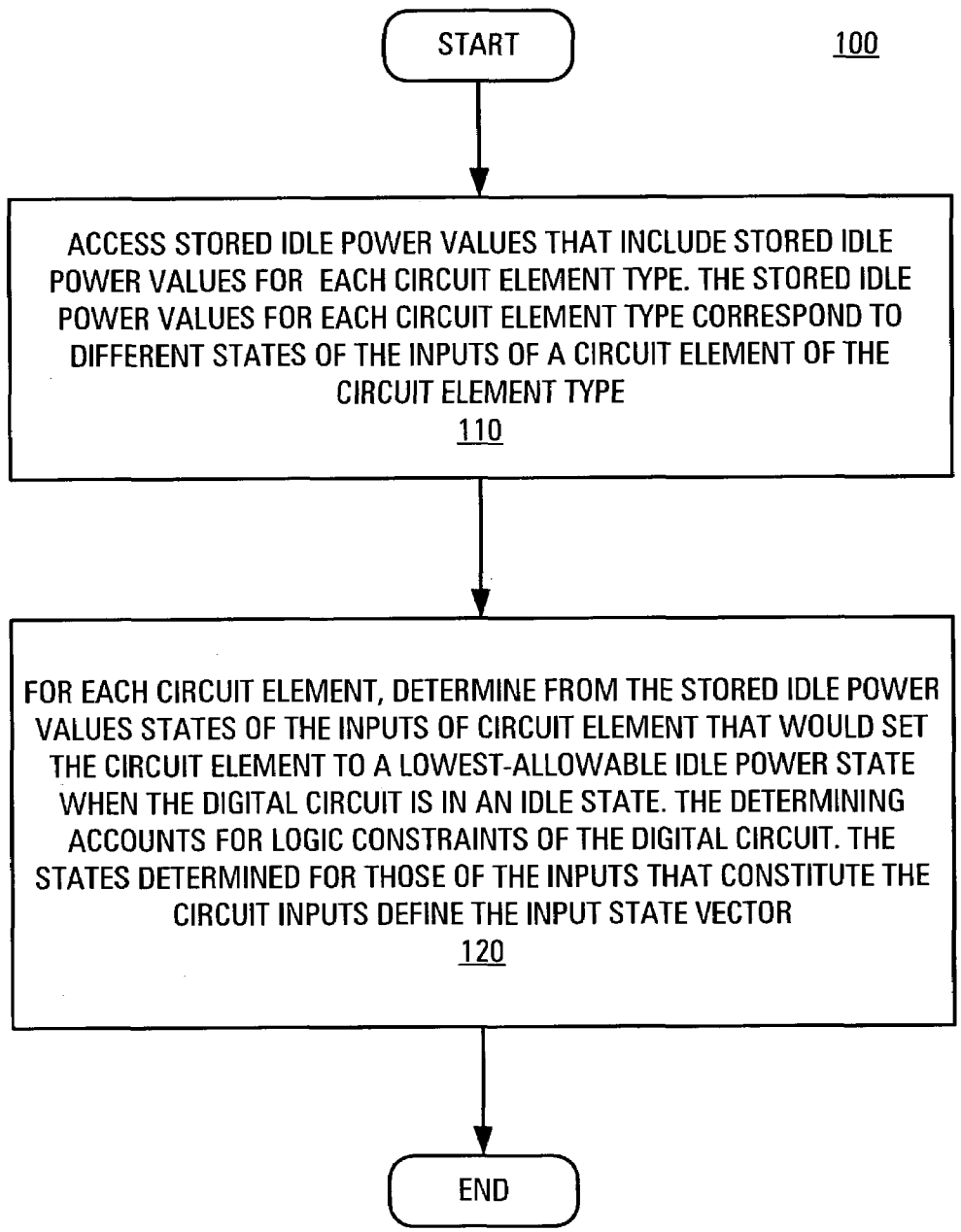
FIG. 1 is a flow diagram illustrating an embodiment of a method in accordance with the invention for determining an input state vector that achieves low power consumption when applied to the circuit inputs of a digital circuit in an idle state.

Embodiments of the invention define an input state vector for application to the circuit inputs of a digital circuit in an idle state. Applying the input state vector determined by the invention to the circuit inputs achieves low power consumption when the digital circuit is in the idle state. The input state vector is composed of an input state, i.e., a zero state or a one state, for each of the inputs of the digital circuit.

The digital circuit for which the input state vector is defined is composed of one or more circuit elements. The circuit elements have respective circuit element types, e.g., AND gate, OR gate, NAND gate, etc. While the digital circuit may be composed of circuit elements of a single circuit element type, e.g., the digital circuit may be composed entirely of AND gates, a typical digital circuit is composed of circuit elements of several different circuit element types, e.g., the digital circuit may be composed of different numbers of AND gates, OR gates, NAND gates, etc.

As used in this disclosure, the term digital circuit encompasses digital circuits ranging in complexity from a digital circuit composed of a single circuit element of one circuit element type to a digital circuit composed of many circuit elements of many circuit element types. A digital circuit will be regarded as being in an idle state when it remains powered up, but is otherwise not operating. The term circuit input will be used to denote an input of the digital circuit. The term input used alone will be used to denote the input of a circuit element.

I. First Method and Apparatus for Defining an Input State Vector that Achieves Low Power Consumption when Applied to the Circuit Inputs of a Digital Circuit in an Idle State An embodiment of a method in accordance with the invention accesses stored idle power values indicating how much power a circuit element of particular circuit element type, e.g., an AND gate, an OR gate, a NAND gate, etc. consumes when in an idle state and when having various input states applied to its physical inputs. Using the stored idle power values, the method determines, for each circuit element of the digital circuit, input states that would set the circuit element to a lowest-allowable idle power state when the digital circuit is in the idle state. As will be described below, the determination of the input states of the circuit element also considers the logic constraints of the digital circuit. As a result, the lowest-allowable idle power state may not be the lowest-possible idle power state, because setting the circuit element to the lowest-possible idle power state may be forbidden by the logic constraints. The input states determined for the circuit elements whose inputs are the circuit inputs collectively constitute the input state vector. When applied to the circuit inputs of the digital circuit in the idle state, the input state vector sets the circuit elements to their respective least-allowable idle power states. Thus, applying the input state vector to the circuit inputs when the digital circuit is in the idle state achieves low power consumption in the digital circuit.

The term low power consumption is intended to indicate that the power consumed by the digital circuit in the idle state is less than that which would be consumed by the digital circuit in the idle state if the input state vector were not applied. It should be noted, however, that the term low power consumption does not necessarily indicate that the lowest-possible power consumption is achieved by the digital circuit in the idle state.

FIG. 1 is a flow diagram illustrating a method 100 in accordance with one embodiment of the invention for determining an input state vector that achieves low power consumption when applied to the circuit inputs of a digital circuit in an idle state. At 110, stored idle power values are accessed. The stored idle power values include idle power values for each of the circuit element types of the one or more circuit elements that comprise the digital circuit. The idle power values for each circuit element type correspond to different states of the inputs of a circuit element of the circuit element type. More specifically, the idle power values include an idle power value for each of the possible combinations of states that can be applied to the inputs of a circuit element of the circuit element type. For example, for a circuit element type that has two inputs, four possible combinations of states can be applied to the inputs of a circuit element of that circuit element type. Specifically, for a circuit element type having two inputs, the possible combinations of the states A and B that can be applied to the inputs are as follows: (A=0, B=0); (A=0, B=1); (A=1, B=0) and (A=1, B=1). As a result, four idle power values are stored for each two-input circuit element type.

Table 1 below shows idle power values for an exemplary two-input NAND gate calculated using a static simulation and a dynamic simulation. The exemplary two-input NAND gate is designed for a 0.25 μm CMOS process and operation at 1.8 V. For the dynamic simulation, the exemplary two-input NAND gate operates at 50 MHz. In the static simulation, prior activity of the circuit element is not considered when determining the idle power value. The states of the inputs (i.e., input states) of the two-input NAND gate are held constant throughout the simulation and the idle power values are calculated using SPICE simulations. Alternatively, the idle power values may be determined by measuring samples of the circuit elements with the different combinations of input states applied to the inputs of the samples. Idle power values determined by a static simulation or static measurement will be called static idle power values.

In the dynamic simulation, the idle power values are dependent on the previous activity of the circuit element. Hence, the dynamic simulation characterizes the circuit element under conditions more similar to real operating conditions. In the dynamic simulation, different combinations of input states are serially applied to the inputs of the circuit element at a rate of 50 MHz. Then, the combination of inputs shown in the table is statically applied to the inputs of the circuit element and respective idle power values are determined. In a simulation, the idle power values are determined by calculation. Alternatively, the idle power values may be determined by measuring samples of the circuit elements. Idle power values determined by a dynamic simulation or dynamic measurement will be called dynamic idle power values.

Table 1 shows that dynamic idle power values can be quite different from static idle power values. This is because intermediate nodes of the circuit element are set at intermediate voltages when the circuit element is active. When the circuit element is put into an idle state, these intermediate voltages determine the current that initially flows in the idle state. Under real operating conditions, an input state vector defined using dynamic idle power values will typically result in a different power consumption in the idle state than one defined using static idle power values. Dynamic idle power values should be used to determine the input state vector for a circuit that is put into the idle state for relatively short periods of time.

TABLE 1

Simulated Static and Dynamic Idle Power Values for 2-Input NAND Gate

| Input States | Static Idle Power Value (pW) | Dynamic Idle Power Value (pW) |
|---|---|---|
| A = 0, B = 0 | 128 | 75 |
| A = 0, B = 1 | 537 | 575 |
| A = 1, B = 0 | 460 | 4,548 |
| A = 1, B = 1 | 161 | 5,621 |

Table 1 indicates that input states of (A=0, B=0) provide the lowest static or dynamic simulation idle power value for the two-input NAND gate.

Returning to FIG. 1, at 120, input states are determined for each circuit element using the stored idle power values for the circuit element type of the circuit element. The input states determined are those that would set the circuit element to a lowest-allowable idle power state when the digital circuit is in the idle state. However, for each circuit element, the available choices for the input states are constrained by the logic constraints of the digital circuit. From the available choices, the input states are chosen that would set the circuit element to the lowest-allowable idle power state when the digital circuit is in the idle state. For example, if input states of (A=0, B=0) do not comply with the logic constraints of the digital circuit, then the input states giving the next-lowest idle power state are chosen until the logic constraints are satisfied. The input states determined for those of the inputs that constitute the circuit inputs define the input state vector.

In one embodiment of a method in accordance with the invention, the input state vector is determined by performing a forward determination. A forward determination begins by determining the input states of the circuit elements closest to the circuit inputs, and then works through the digital circuit in a forward direction along a path extending away from the circuit inputs X, Y and $C_{in}$. A forward determination can be performed on the entire digital circuit or on a subset of a larger digital circuit. In one such approach, the forward determination begins with determining input states for circuit elements whose inputs constitute a subset of the circuit inputs of the larger digital circuit.

Figure 2:
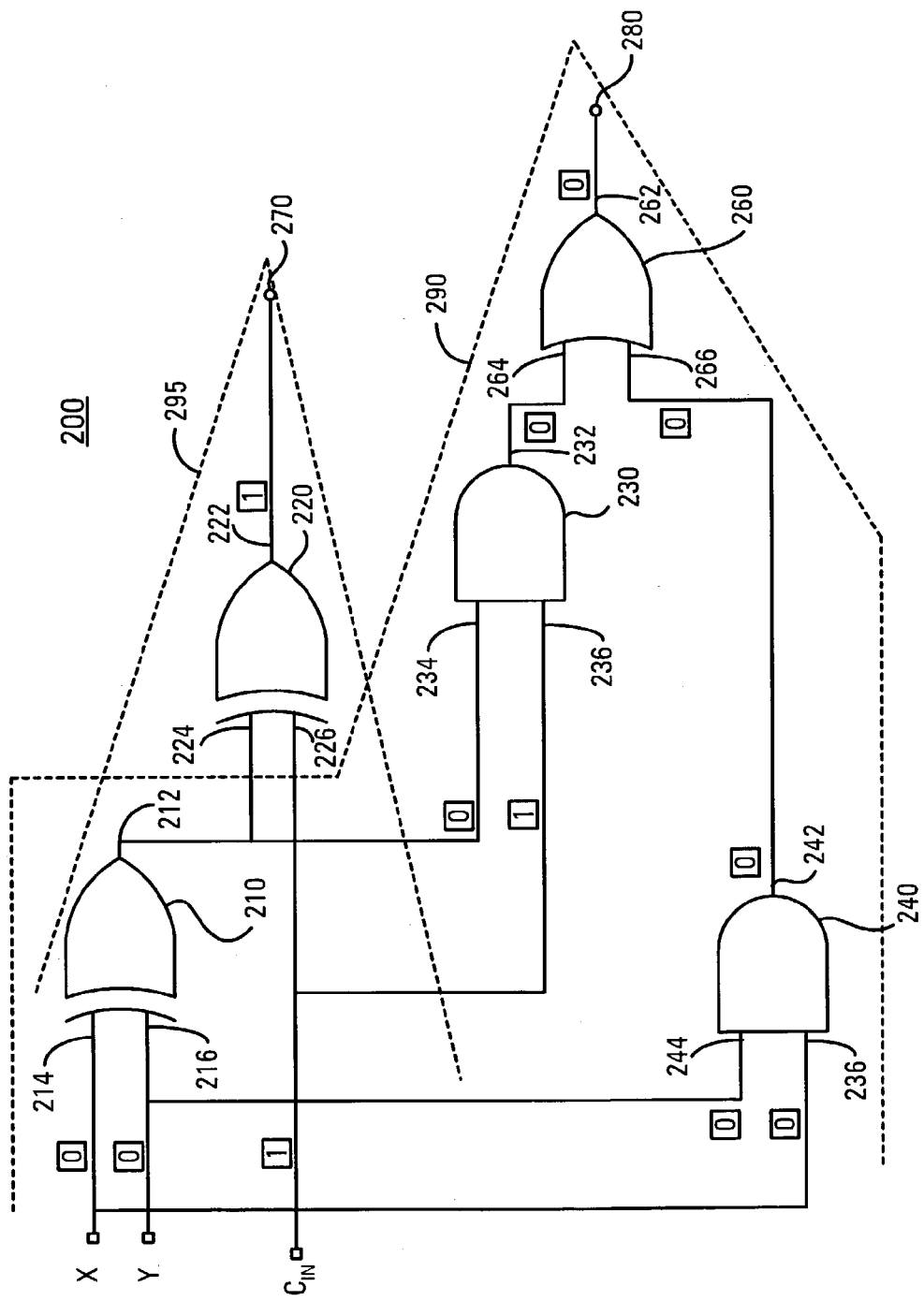
FIG. 2 is a schematic diagram of an exemplary digital circuit for which an input state vector is defined by a method in accordance with the invention in which the states of the inputs of the circuit elements are determined working through the digital circuit along a path that extends away from the circuit inputs.

FIG. 2 is a schematic diagram of an exemplary digital circuit 200 that will be used to illustrate the use of an embodiment of the method 100 described above with reference to FIG. 1 to determine an input state vector by performing a forward determination, as described above. Exemplary digital circuit 200 is an adder circuit comprised of circuit elements 210, 220, 230, 240, and 260 electrically interconnected as shown. Digital circuit 200 includes circuit inputs X, Y and $C_{in}$ and circuit outputs 270 and 280. Digital circuit 200 is composed of five circuit elements of three circuit element types, i.e., two two-input XOR gates 210 and 220, two two-input AND gates 230 and 240, and one two-input OR gate 260. Digital circuit 200 is merely an example of a digital circuit for which an input state vector can be determined using the below-described embodiment of the method 100: method 100 can be used to determine an input state vector for any digital circuit comprised of any number of circuit elements of any number of circuit element types with any number of inputs, e.g., one, two, or more inputs and fabricated by any fabrication process.

The circuit elements of adder circuit 200 are of three circuit element types, namely, XOR gate (XOR gates 210 and 220), AND gate (AND gates 230 and 240), and OR gate (OR gate 260). Simulations are performed on circuit elements of the three circuit element types to find the idle power values for each possible combination of states of the inputs of the circuit elements. The idle power values shown in Table 2 for each of the circuit element types of digital circuit 200 are dynamic idle power values obtained by dynamic simulation of the respective circuit elements. It should be noted that the dynamic idle power values shown in Tables 1 and 2 are typical values, since the dynamic idle power values depend in part on the conditioning applied to the inputs of the circuit element before the idle power values are calculated or measured.

TABLE 2

| | Dynamic Idle Power Values | | |
|---|---|---|---|
| Input States | Idle Power Value XOR (pW) | Idle Power Value OR (pW) | Idle Power Value AND (pW) |
| A = 0, B = 0 | 704 | 16,680 | 34,810 |
| A = 0, B = 1 | 28,910 | 9,102 | 28,870 |
| A = 1, B = 0 | 724 | 550 | 15,590 |
| A = 1, B = 1 | 11,620 | 6,185 | 7,250 |

To begin the forward determination, one of circuit elements 210 or 240 is selected. Circuit elements 210 and 240 are the circuit elements closest to circuit inputs X, Y and $C_{in}$, of the digital circuit. In this example, inputs 214 and 216 of circuit element 210 and input 226 of circuit element 240 constitute the circuit inputs X, Y and $C_{in}$, respectively, of digital circuit 200. Using the stored idle power values, input states that provide the lowest-allowable idle power value of the selected circuit element are determined. For example, XOR gate 210 is selected and the input states that, when applied to inputs 214 and 216 of XOR gate 210 provide the lowest-allowable idle power value for circuit element 210 are chosen as the input states for circuit element 210. Alternatively, AND gate 240 could be selected as the first circuit element whose input states are determined.

For XOR gate 210, four possible combinations of input states can be applied to inputs 214 and 216. Specifically, input state combinations of (A=0, B=0); (A=1, B=0); (A=0, B=1); and (A=1, B=1) can be applied. Since XOR gate 210 is the first circuit element whose input states are determined in the forward determination, no logic constraints exist on the input states that can be applied to XOR gate 210. Consequently, the lowest-allowable idle power value is the lowest-possible idle power value. Table 2 shows that, of the four input state combinations available, the input state combination giving the lowest-possible idle power value is (A=0, B=0). The method therefore selects the input states (A=0, B=0) as the input states of XOR gate 210. Such input states applied to the inputs 214 and 216 of XOR gate 210 sets the output 212 of XOR gate 210 to a state of 0.

Continuing with the forward determination, the input states for AND gate 230 are determined. Table 2 shows that, of the four available input state combinations (A=0, B=0); (A=1, B=0); (A=0, B=1) and (A=1, B=1), the input state combination (A=1, B=1) gives the lowest idle power value. However, the method accounts for the logic function of XOR gate 210 by requiring that the output 212 of XOR gate 210, which is connected to input 234 of AND gate 230, have a state of 0. Consequently, the allowable input state combinations for AND gate 230 must have an input state of (A=0). Table 2, shows that the input state combination that gives the lowest idle power value is (A=1, B=1). However, such an input state combination does not comply with the logic constraints of digital circuit 200. Of the two available input state combinations (A=0, B=0 and A=0, B=1) that do comply with the logic constraints of the digital circuit, Table 2 shows that the input state combination (A=0, B=1) gives the lowest-allowable idle power value. Thus, the method selects an input state of 1 for application to the input 236 of AND gate 230. Such selected input states applied to the inputs 234 and 236 of AND gate 230 set the output 232 of AND gate 230 to a state of 0.

The forward determination next determines the input states for OR gate 260. As described above, logic constraints of the digital circuit 200 require the output 232 of AND gate 230 to have a state of 0. Because the inputs 244 and 246 of AND gate 240 are also connected to the inputs 214 and 216 of XOR gate 210, the method now determines that the input states for the inputs 244 and 246 of AND gate 240 are (A=0, B=0). Such input states applied to the inputs of AND gate 240 set the output 242 of AND gate 240 to a state of 0. The output 242 of AND gate 240 is connected to the input 266 of OR gate 260 and the output 232 of AND gate 230 is connected to the input 264 of OR gate 260. Input states of (A=0, B=0) applied to the inputs 264 and 266 of OR gate 260 set the output 262 of OR gate 260 to a state of 0.

The forward determination next determines the input states for XOR gate 220. The input states that have already been determined for the inputs 214 and 216 of XOR gate 210 set the output 212 of XOR gate 210 to a state of 0. Also, the input 226 of XOR gate 220 is connected to the input 234 of AND gate 230, which has previously been determined to have a state of 1. Thus, the input states for the inputs 224 and 226 of XOR gate 220 are already defined as 0 and 1, respectively. Input states of 0 and 1 applied to the inputs 224 and 226 of XOR gate 220 set the output 222 of XOR gate 220 to a state of 1.

The inputs 214 and 216 of XOR gate 210 are connected to circuit inputs X and Y, respectively. The input 226 of XOR gate 220 is connected to circuit input $C_{in}$. The input states of inputs 214, 216 and 226 are determined by the above-described forward determination to be 0, 0 and 1, respectively. Thus, the forward-determined input state vector determined by the forward determination just described has states of (X=0, Y=0, $C_{in}$=1). Application of the forward-determined input state vector to the circuit inputs of digital circuit 200 achieves low power consumption when digital circuit 200 is in an idle state. Furthermore, the method accounts for logic constraints of digital circuit 200 during the determination of the input state vector. In addition, when logic conflicts arise at a particular circuit element, input states that give the next-lowest idle power value and that avoid the logic conflict are assigned to the circuit element.

When performing the forward determination just described, and as a consequence of selecting the circuit element at which the forward determination begins, digital circuit 200 may be divided into segments and the forward determination may be performed on the segments in turn. For example, when XOR gate 210 is selected as the circuit element at which the forward determination begins, input states for all the circuit element located in one segment, segment 290, may be determined before input states for the remaining circuit elements of digital circuit 200 are determined. The circuit elements belonging to a given segment depends on the logical coupling of the circuit elements. For example, because output 212 of XOR gate 210 is connected to input 234 of AND gate 230, it may be desirable or efficient to determine the appropriate input states for AND gate 230 after first determining the input states for XOR gate 210. Similarly, because the output 232 of AND gate 230 is connected to input 264 of OR gate 260, it may be desirable to next determine the input states for OR gate 260. Due to such electrical interconnection of the circuit elements comprising digital circuit 200, the segmentation just described may be a natural consequence of, or a desired approach to, determining the input state vector for digital circuit 200.

In one embodiment, two segments, segment 290 and segment 295, logically evolve during the forward determination of the input state vector. Segment 290 and segment 295 are referred to as fan-in cones. Although such segmentation may occur in the present embodiment, the other embodiments of the invention can determine the input states for circuit elements of the digital circuit using various other types of segmentation. For example, any subset of inputs that control a subset of the outputs can be regarded as a segment. In another example, a fan-in cone can be divided into sub-fan-in cones. Thus, the invention is not limited to determining the input states of the circuit elements of a digital circuit segmented according to any particular approach or even to requiring that segmentation occur at all. In embodiments in which the digital circuit is not segmented, references to segment should be taken to refer to the entire digital circuit.

Another embodiment of method 100 determines the input state vector by performing a backward determination in which the input states of the circuit elements are determined working backwards through digital circuit 200 along a path that extends towards circuit inputs X, Y and $C_{in}$. A backward determination begins by determining input states of circuit elements closest to the circuit outputs 270 and 280 and then working backwards through the digital circuit along a path that extends towards the circuit inputs. The backward determination determines an input state vector that achieves low power consumption when applied the digital circuit in an idle state.

Figure 3:
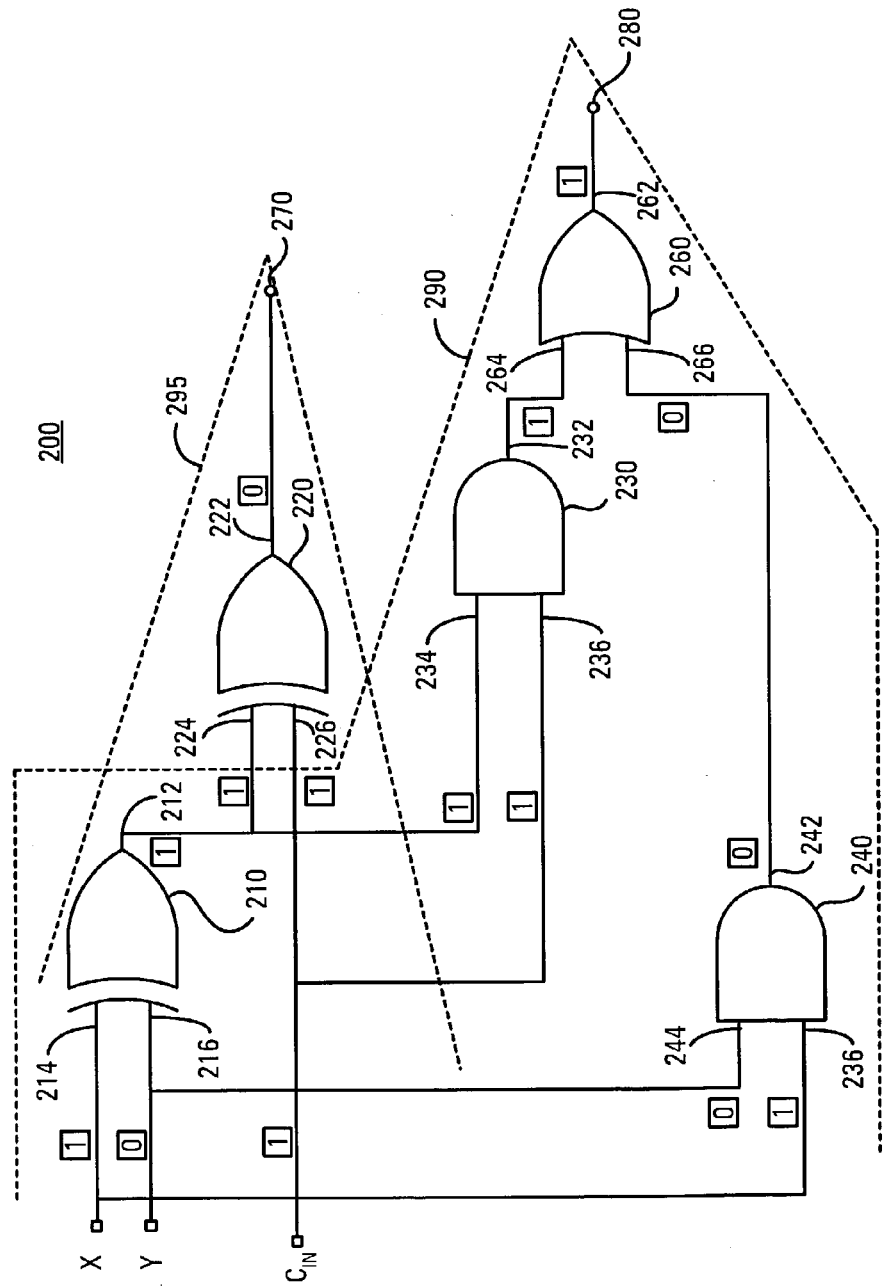
FIG. 3 is a schematic diagram of an exemplary digital circuit for which an input state vector is defined by a method in accordance with the invention in which the states of the inputs of the circuit elements are determined working through the digital circuit along a path that extends towards the circuit inputs.

FIG. 3 is a schematic diagram of the above-described exemplary digital circuit 200 that will be used to illustrate a backward determination performed by another embodiment of the method 100 described above with reference to FIG. 1. Although FIG. 3 shows a circuit composed of five circuit elements of three circuit element types in which all of the circuit element types are two-input circuit element types, other embodiments of the method according to the invention can define an input state vector for digital circuits comprised of any number of circuit elements of any number of circuit element types with any number of inputs, e.g., one, two, or more inputs, fabricated using any fabrication process.

The backward determination first determines the input states for OR gate 260. OR gate 260 and XOR gate 220 are the circuit elements of digital circuit 200 closest to outputs 270 and 280. The backward determination could alternatively have started XOR gate 220. Because OR gate 260 is the first circuit element whose input states are determined, no logic constraints need be considered when determining appropriate input states. Thus, four input state combinations are available for OR gate 260. The four input state combinations are: (A=0, B=0); (A=1, B=0); (A=0, B=1); (A=1, B=1). Table 2 shows that, of the four input state combinations available, the input state combination giving the lowest idle power value is (A=1, B=0). Such input states applied to the inputs 264 and 266 of OR gate 260 sets the output 262 of OR gate 260 to a state of 1.

The backward determination next determines the input states for AND gate 230. Table 2 shows that, of the four available input state combinations, the input state combination of (A=1, B=1) results in the lowest idle power value. However, the backward determination accounts for the logic function of OR gate 260 by realizing that the output 232 of AND gate 230, which is connected to the input 264 of OR gate 260, has been previously determined to have an input state of 1. Thus, the input states for AND gate 230 must be ones that set output 232 to a state of 1. Only input states of (A=1, B=1) applied to the inputs 234 and 236 of AND gate 230 will set output 232 to a state of 1. Thus, the backward determination determines input states (A=1, B=1) for the inputs 234 and 236 of AND gate 230.

The backward determination next determines input states for XOR gate 210 and AND gate 240. Output 212 of XOR gate 210 must have a state of 1, as this output is connected to input 234 of AND gate 230. Accounting for the logic function of XOR gate 210, the backward determination determines that the allowable input states for XOR gate 210 are (A=0, B=1) or (A=1, B=0). Table 2 shows that input states of (A=1, B=0) result in a lower idle power value. Thus, the backward determination determines input states (A=1, B=0) for the inputs 214 and 216 of XOR gate 210.

Because the inputs 214 and 216 of XOR gate 210 are connected to the inputs 244 and 246, respectively, of AND gate 240, the backward determination determines input states of (A=1, B=0) for the inputs 244 and 246 of AND gate

240. In addition, the backward determination previously determined input states (A=1, B=1) for the inputs 224 and 226 of XOR gate 220. Input states (A=1, B=1) applied to the inputs of XOR gate 220 set the output 222 of XOR gate 220 to a state of 0.

The inputs 214 and 216 of XOR gate 210 are connected to circuit inputs X and Y, respectively. The input 226 of XOR gate 220 is connected to circuit input $C_{in}$. The input states of inputs 214, 216 and 226 are determined by the above-described backward determination to be 1, 0 and 1, respectively. Thus, the backward-determined input state vector determined by the above-described backward determination has states of (X=1, Y=0, $C_{in}$=1). Application of the backward-determined input state vector to the circuit inputs of digital circuit 200 achieves low power consumption when digital circuit 200 is in an idle state. Furthermore, the backward determination accounts for logic constraints of digital circuit 200 during the determination of the input state vector. In addition, when logic conflicts arise at a particular circuit element, the input state combination giving the next-lowest idle power value and that avoids the logic conflict is assigned to the circuit element.

Figure 4:
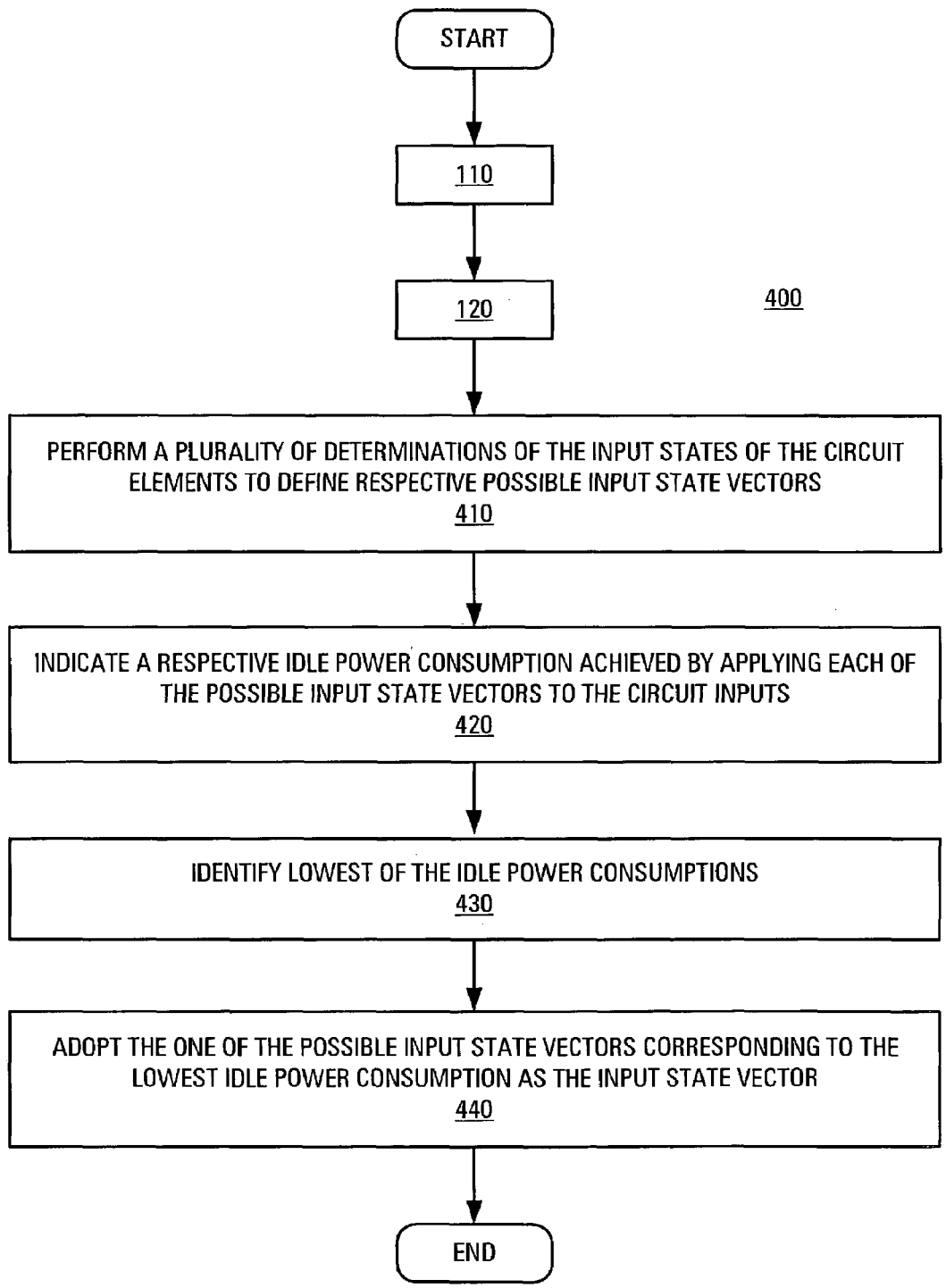
FIG. 4 is a flow diagram illustrating an embodiment of a method in accordance with the invention that performs a plurality of determinations of the states of the inputs of the circuit elements to define respective possible input state vectors and adopts as the input state vector the possible input state vector that gives the lowest idle power consumption.

FIG. 4 is a flow diagram illustrating a second embodiment 400 of a method in accordance with the invention for determining an input state vector for a digital circuit that achieves low power consumption when applied to the circuit inputs of the digital circuit in an idle state. In method 400, possible input state vectors are determined for the digital circuit and the one of the possible input state vectors that achieves the lowest idle power consumption when applied to the circuit inputs of the digital circuit in an idle state is adopted as the input state vector for the digital circuit. Elements of method 400 that correspond to elements of method 100 described above with reference to FIG. 1 are indicated using the same reference numerals and will not be described again here.

In block 410, a plurality of determinations of the input states of the digital circuit elements is performed to define respective possible input state vectors.

In block 420, respective idle power consumptions that would result from applying each of the possible input state vectors to the circuit inputs of the digital circuit are indicated. Each idle power consumption may be indicated by summing the idle power values of the circuit elements that constitute the digital circuit in response to the respective possible input state vector applied to the circuit inputs. Various other methods for indicating the idle power consumptions can alternatively be implemented. Such various methods include, but are not limited to, direct measurement and the application of circuit simulations such as a SPICE simulation.

In block 430, the lowest of the idle power consumptions is identified.

In block 440, the one of the possible input state vectors that corresponds to the lowest idle power consumption is adopted as the input state vector for subsequent application to the circuit inputs of the digital circuit in an idle state. The possible input state vector adopted as the input state vector depends on which of the idle power consumptions was identified as the lowest idle power consumption in block 430.

In an example of method 400 in which two determinations of the states of the inputs of the circuit elements are performed, in block 410, a forward determination described above with reference to FIG. 2 is performed as one of the determinations. The forward determination defines a first possible input state vector. In the forward determination, the input states of the circuit elements are determined working forward through the digital circuit along a path that extends away from the circuit inputs. Using the example of the adder circuit 200 shown in FIG. 2, the first possible input state vector determined by such forward determination is (X=0, Y=0, and $C_{in}$=1).

Additionally, in block 410, a backward determination described above with reference to FIG. 3 is performed as the other of the determinations of the states of the inputs of the circuit elements. The backward determination defines a second possible input state vector. In the backward determination, the input states of the circuit elements are determined working backward through the digital circuit along a path that extends towards the circuit inputs. Using the example of the adder circuit 200 shown in FIG. 3, the second possible input state vector determined by such backward determination is (X=1, Y=0, and $C_{in}$=1).

In a quantitative example of the idle power consumption indications performed in block 420 when method 400 is applied to the digital adder circuit 200 shown in FIGS. 2 and 3, the first idle power consumption obtained when the first possible input state vector determined by the forward determination is applied to the circuit inputs of digital circuit 200 is calculated as follows:

$$P_{(First\_IPC)} = 704 + 28{,}910 + 28{,}870 + 34{,}810 + 16{,}680 \text{ pW}$$

$$= 109{,}970 \text{ pW}.$$

The second idle power consumption obtained when the second possible input state vector determined by the backward determination is applied to the circuit inputs of digital circuit 200 is calculated as follows:

$$P_{(Second\_IPC)} = 724 + 11{,}620 + 7{,}250 + 28{,}870 + 550 \text{ pW}$$

$$= 49{,}000 \text{ pW}.$$

In the above quantitative example, the second idle power consumption corresponding to the second possible input state vector determined by the backward determination is identified in block 430 as the lowest of the idle power consumptions.

Since the second idle power consumption corresponding to the second possible input state vector determined by the backward determination is lower than the first idle power consumption corresponding to the first possible input state vector determined by the forward determination, in block 440, the second possible input state vector is adopted as the input state vector for subsequent application to the circuit inputs of digital circuit 200 in an idle state. As a result, the input state vector, determined by the backward determination of a possible input state vector, is (X=1, Y=0, $C_{in}$=1).

The forward determination and the backward determination referred to in the preceding example are merely examples of two determinations of the states of the inputs of the circuit elements that can be performed. Other embodiments in accordance with the invention may employ various other types of determinations to determine the states of the inputs of the circuit elements. In one embodiment, one of the determinations is comprised of a forward determination that begins at a first location in the digital circuit and, as a result, proceeds through the digital circuit along a first path that extends away from the circuit inputs, and another of the determinations is comprised of a forward determination that begins at a second location, different from the first location, and, as a result, proceeds through the digital circuit along a path different from the first path. In another embodiment, one of the determinations is comprised of a backward determination that begins at a first location in the digital circuit and proceeds through the digital circuit along a first path that extends towards the circuit inputs, and another of the determinations is comprised of a backward determination that begins at a second location, different from the first location and, as a result, proceeds through the digital circuit along a path different from the first path. Additionally, determination types other than forward or backward determinations can be employed in block 410. Moreover, more than two determinations, each of which defines a respective possible input state vector, can be performed. Thus, it will be understood that embodiments of the method in accordance with the invention can perform a plurality of various types of determinations in block 410.

Although embodiments of a method according to the invention have been described above using dynamic idle power values for the circuit elements that comprise the digital circuit, other embodiments of the method according to the invention can use static idle power values. Table 1 lists both static and dynamic idle power values for the exemplary 2-input NAND gate. Table 1 shows that dynamic idle power values can be quite different from static idle power values, for the reasons described above. Consequently, under real operating conditions, an input state vector defined using dynamic idle power values will typically result in a different power consumption in the idle state than one defined using static idle power values.

The dynamic idle power values shown in Table 1 may not be completely representative of an actual 2-input NAND gate, but are sufficiently accurate to show that static and dynamic idle power values can differ. Other embodiments according to the invention can use a combination of dynamic and static idle power values for the circuit elements that comprise the digital circuit to determine an input state vector that achieves low power consumption when applied to the circuit inputs of the digital circuit in an idle state. Such a combination of dynamic and static idle power values may depend on the particular operational environment for which the digital circuit is designed and to which it is exposed. The embodiments of the method described above with reference to FIGS. 1 and 4 can use static or dynamic or a combination of static and dynamic idle power values to define an input state vector that achieves low power consumption when applied to the circuit inputs of a digital circuit in an idle state.

The embodiments described above determine an input state vector for application to the circuit inputs of a digital circuit. More specifically, the embodiments determine an input state vector based upon a received description of the digital circuit, e.g., a computer code representation of the digital circuit generated by software sold under the trademark VERILOG® or VHDL®, or generated by software known as SPICE. The embodiment of the method to be described next identifies logically-permissible input connection alterations that could be made to the circuit elements of a digital circuit. The input connection alterations reduce the power consumption when the input state vector is applied to the circuit inputs of the digital circuit in an idle state. The method determines logically-permissible input connection alterations that can be made before the digital circuit is physically fabricated. Implementing such input connection alterations reduces the power consumption of the digital circuit when the input state vector is applied to the circuit inputs of the digital circuit in an idle state relative to that of the digital circuit prior to implementing the changes.

Figure 5:
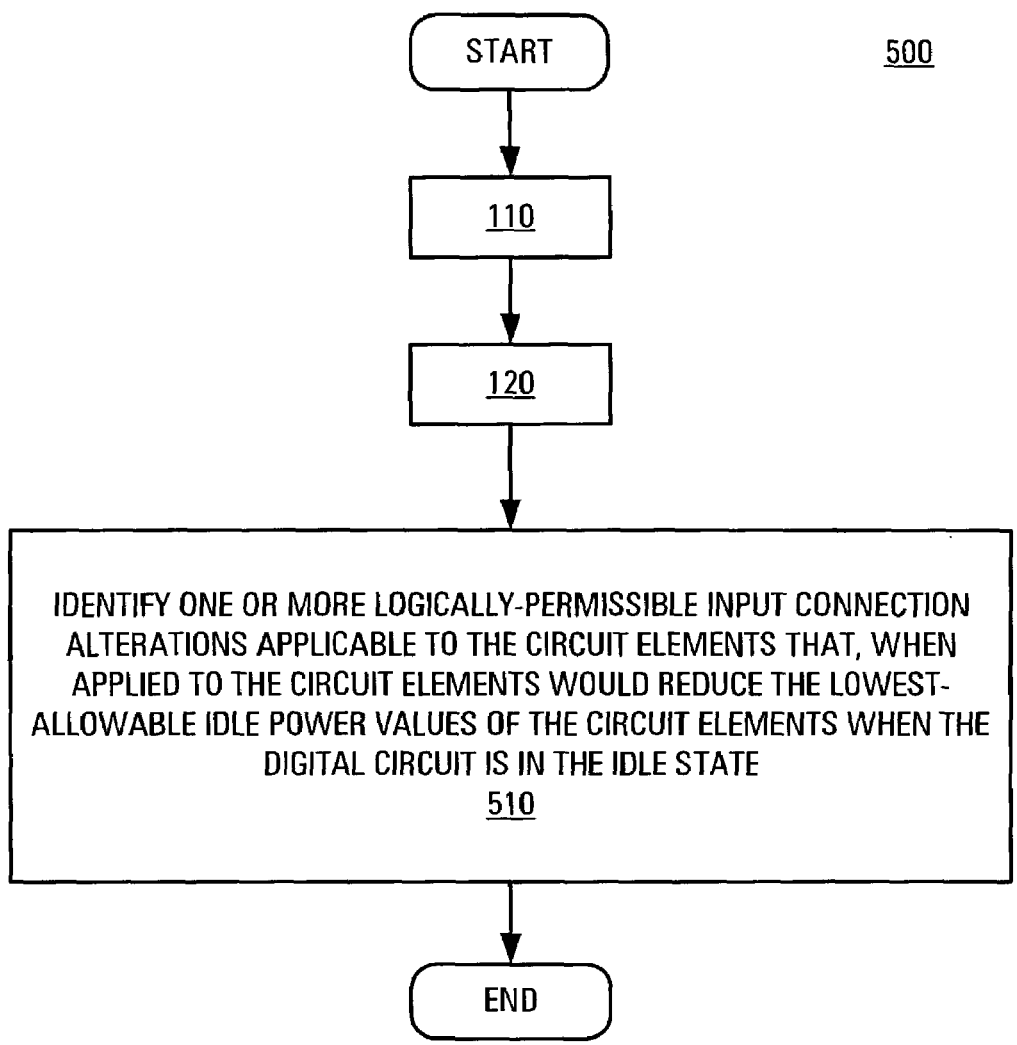
FIG. 5 is a flow diagram illustrating an embodiment of a method in accordance with the invention that determines logically-permissible input connection alterations for a circuit element in a digital circuit.

FIG. 5 is a flow chart showing an embodiment 500 of a method in accordance with the invention that identifies one or more logically-permissible input connection alterations that, when applied to the digital circuit, reduce the idle power consumption when the input state vector is applied to the circuit inputs of the digital circuit in an idle state. Elements of method 500 that correspond to elements of method 100 described above with reference to FIG. 1 are indicated using the same reference numerals and will not be described again here.

At 510, one or more logically-permissible input connection alterations are identified for the circuit elements that comprise the digital circuit. Such logically-permissible input connection alterations, when applied to the respective circuit elements, reduce the idle power values of the circuit elements when the input state vector is applied to the circuit inputs of the digital circuit in an idle state. The identified input connection alterations are logically-permissible in the sense that the logic functionality of the digital circuit is maintained when such input connection alterations are implemented.

For purposes of the present disclosure, the term "logically-permissible input connection alteration" refers to an alteration to the arrangement of the physical input connections of a circuit element. When permutations of the physical input connections of a circuit element are logically equivalent, the arrangement of the physical input connections of the circuit element can be altered without changing the logic of the digital circuit and hence is logically-permissible.

Referring still to block 510 shown in FIG. 5, logically-permissible alterations of the arrangement of the physical input connections of the circuit elements comprising the digital circuit are examined to determine which of the arrangement of the physical input connections achieves the lowest-allowable idle power value for the circuit element when the digital circuit is in an idle state. If the arrangement of the physical input connections giving the lowest-allowable idle power value for the circuit element is not the initial arrangement of the physical input connections, then the method indicates a proposed change to the arrangement of the physical input connections of the circuit element. By indicating such proposed logically-permissible input connection alterations, method 500 enables the arrangements of the physical input connections of the circuit elements of the digital circuit to be altered to achieve logically-permissible arrangements of the physical input connections that cause the respective circuit elements to have lowest-allowable idle power values lower than with the original arrangements of the physical input connections.

Figure 6A:
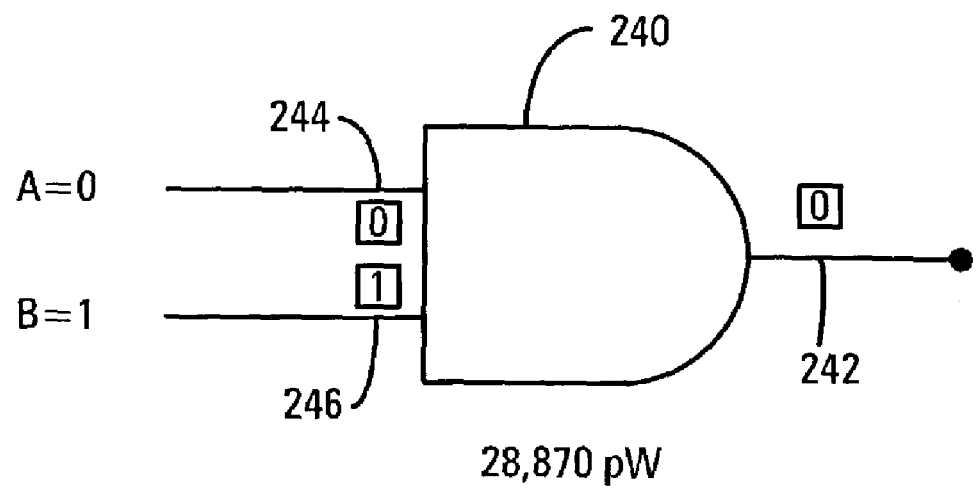
FIGS. 6A and 6B are block diagrams of a circuit element illustrating logically-equivalent arrangements of the physical input connections of the circuit element.
Figure 6B:
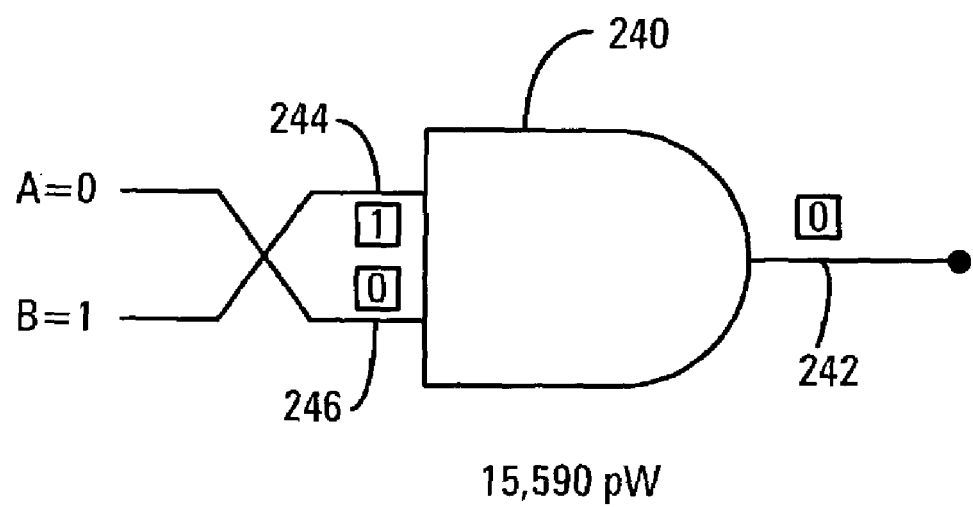

FIG. 6A shows AND gate 240 of the adder circuit 200 described above with reference to FIGS. 2 and 3. The backward determination described above with reference to FIG. 3 determines input states of (A=0, B=1) to be applied to physical inputs 244 and 246, respectively. Table 2 shows that applying input states of (A=0, B=1) to physical inputs 244 and 246, respectively, achieves an idle power value of 28,870 pW for AND gate 240. However, AND gate 240 is an example of a circuit element that has logically-equivalent physical inputs. That is, input states of, for example, (A=0, B=1) applied to physical inputs 244 and 246, respectively, or to physical inputs 246 and 244, respectively, set output 242 to the same state. FIG. 6A shows input state A applied to physical input 244 and input state B applied to physical input 246. FIG. 6B shows a logically-permissible alteration of the physical inputs of AND gate 240 in which input state B is applied to physical input 244 and input state A is applied to physical input 246. Table 2 shows that applying input states of (A=0, B=1) to physical inputs 246 and 244, respectively, of AND gate 240 achieves an idle power value of 15,590 pW.

The method compares the idle power values for AND gate 240 between the arrangement of the physical input connections shown in FIG. 6A and that shown in FIG. 6B and, as in the case of this example, when the comparison indicates that the arrangement of the physical input connections shown in FIG. 6B provides a lower idle power value, the method indicates that changing the arrangement of the physical input connections of AND gate 240 to that shown in FIG. 6B would reduce the idle power value of AND gate 240 when the digital circuit is in the idle state without compromising the logic of the digital circuit.

While method 500 has been described with reference to an example applied to a two-input circuit element, the method can determine logically-permissible input connection alterations for circuit elements having more than two inputs. Appropriately interchanging logically-equivalent inputs of the circuit element can result in that circuit element having a lower idle power value. Altering the arrangement of the physical input connections of at least one of the circuit elements in a digital circuit can reduce the idle power consumption for a given input state vector applied to the circuit inputs of the digital circuit in an idle state. Thus, the invention not only provides a method for determining an input state vector that achieves low power consumption when applied to the circuit inputs of the digital circuit in an idle state, but additionally provides a method for determining logically-permissible input connection alterations that, when applied to the circuit elements that comprise the digital circuit, reduce the power consumption when the input state vector is applied to the circuit inputs of the digital circuit in an idle state.

Figure 7:
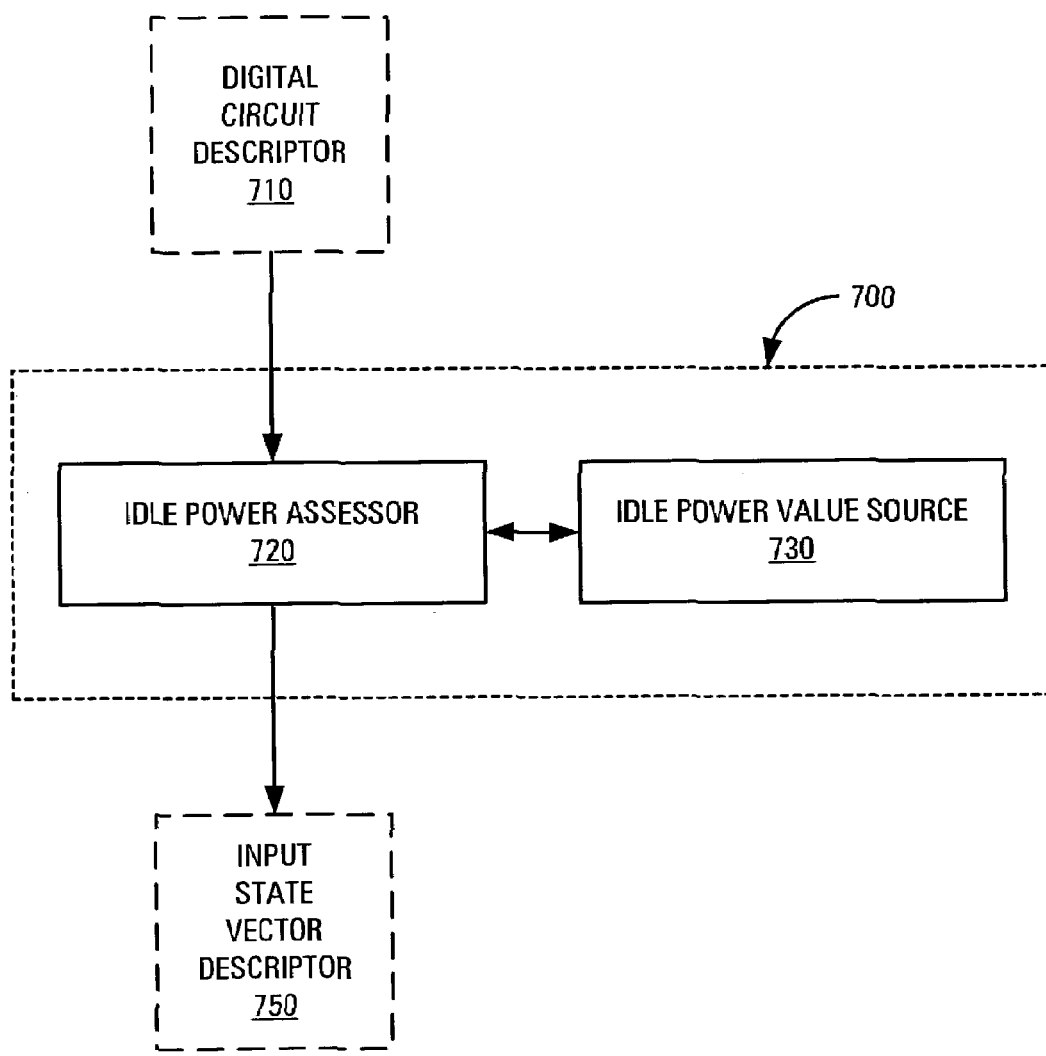
FIG. 7 is a block diagram of a first embodiment of an apparatus in accordance with the invention for defining an input state vector that achieves low power consumption when applied to the circuit inputs of a digital circuit in an idle state.

FIG. 7 is a block diagram of an exemplary embodiment 700 of an apparatus in accordance with the invention for defining an input state vector for application to the circuit inputs of a digital circuit in an idle state. Apparatus 700 defines an input state vector that achieves low power consumption when applied to the circuit inputs of the digital circuit in an idle state. Apparatus 700 receives a digital circuit descriptor 710 representing the digital circuit. Such a digital circuit descriptor 710 can be, for example, computer code representing the digital circuit. The apparatus generates an input state vector descriptor 750 that defines an input state vector that achieves low power consumption when applied to the circuit inputs of the digital circuit in an idle state.

Apparatus 700 comprises an idle power assessor 720 coupled to an idle power value source 730. Idle power value source 730 comprises memory capable of storing idle power values for the different circuit element types of the circuit elements that comprise the digital circuit. The idle power values for each circuit element type correspond to different states of the inputs of a circuit element of the circuit element type. In one embodiment, idle power value source 730 is structured as a look-up table. Idle power value source 730 may be integral with apparatus 700. Alternatively, idle power value source 730 may be located remotely from apparatus 700 and coupled to apparatus 700 by a communication link. The idle power values stored in the idle power value source for a given circuit element type may be static idle power values or dynamic idle power values or a combination of static idle power values and dynamic idle power values for a circuit element of the given circuit element type. Apparatus 700 additionally comprises an idle power assessor 720 coupled to idle power value source 730.

In response to digital circuit descriptor 710, idle power assessor 720 accesses the idle power values stored in idle power value source 730 and, for each circuit element that comprises the digital circuit, uses the stored idle power values for the circuit element type of the circuit element to determine states of the inputs of the circuit element that would set the circuit element to a lowest-allowable idle power state when the digital circuit is in an idle state. Moreover, idle power assessor 720 accounts for the logic constraints of the digital circuit when determining the states of the inputs. The states determined for those of the inputs that constitute the circuit inputs define the input state vector. An example of the processing performed by an embodiment of idle power assessor 720 is described in detail above with reference to block 120 of FIG. 1.

Figure 8:
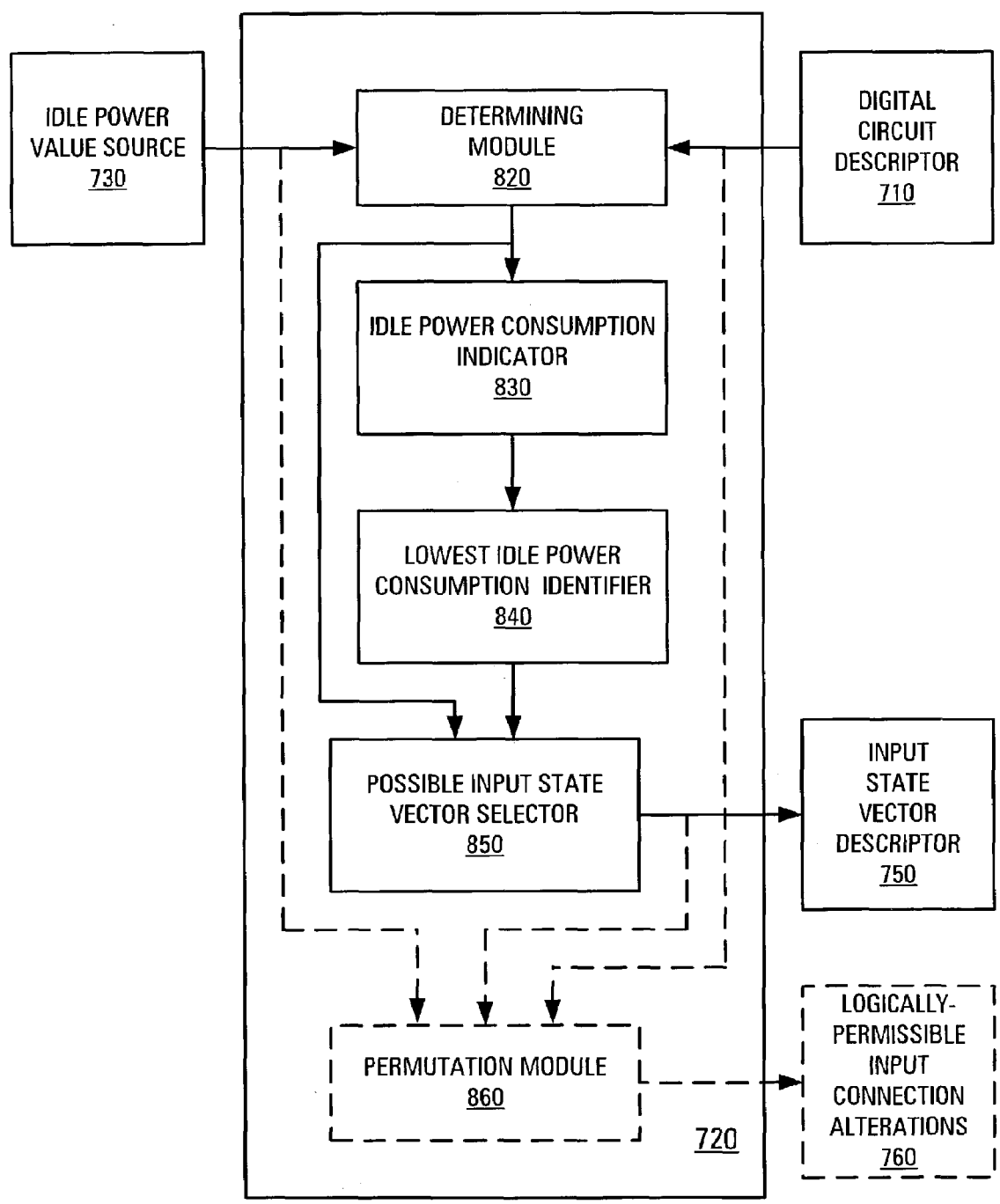
FIG. 8 is a block diagram of a second embodiment of an apparatus in accordance with the invention for defining an input state vector that achieves low power consumption when applied to the circuit inputs of a digital circuit in an idle state.

FIG. 8 is a block diagram showing an embodiment of the idle power assessor 720 of apparatus 700. Idle power assessor 720 generates input state vector descriptor 750 in response to digital circuit descriptor 710 and the idle power values stored in idle power value source 730. Input state vector descriptor 750 defines an input state vector that achieves low power consumption when applied to the circuit inputs of the digital circuit in an idle state. An example of the processing performed by an embodiment of idle power assessor 720 is described in detail above with reference to FIG. 4.

The embodiment of idle power assessor 720 shown in FIG. 8 is composed of a determining module 820, an idle power consumption indicator 830, an idle power consumption identifier 840 and a possible input state vector selector 850. Determining module 820 is coupled to idle power value source 720 and is connected to receive digital circuit descriptor 710. Idle power consumption indicator 830 is coupled to determining module 820. Lowest idle power consumption identifier 840 is coupled to idle power consumption indicator 830, and possible input state vector selector 850 is coupled to determining module 820 and idle power consumption identifier 840.

Determining module 820 is configured to perform a plurality of determinations of the states of the inputs of the circuit elements of the digital circuit to define respective possible input state vectors. In an embodiment, determining module 820 performs the process illustrated in block 410 of FIG. 4.

Idle power consumption indicator 830 is configured to indicate an idle power consumption achieved by applying each of the possible input state vectors determined by determining module 820 to the circuit inputs of the digital circuit in the idle state. In an embodiment, idle power indicator 830 performs the process illustrated in block 420 of FIG. 4.

Lowest idle power identifier 840 is configured to identify the lowest of the idle power consumptions indicated by the idle power consumption indicator 830. In an embodiment, lowest idle power identifier 840 performs the process illustrated in block 430 of FIG. 4.

Possible input state vector selector 850 is configured to select the one of the possible input state vectors determined by determining module 820 as the input state vector.

The one of the possible input state vectors selected is that which corresponds to the lowest idle power consumption indicated by lowest idle power consumption indicator 830. In an embodiment, possible input state vector selector performs the process illustrated in block 440 of FIG. 4.

In an example of the operation of idle power assessor 720, determining module 820 performs one determination of the states of the inputs of the circuit elements by performing a forward determination to define a first possible input state vector. The determining module additionally performs another determination of the states of the inputs of the circuit elements by performing a backward determination to define a second possible input state vector. Idle power consumption indicator 830 indicates a first idle power consumption that is the power consumption of the digital circuit in the idle state when the first possible input state vector is applied to the circuit inputs. The idle power consumption indicator additionally indicates a second idle power consumption that is the power consumption of the digital circuit in the idle state when the second possible input state vector is applied to the circuit inputs. Lowest idle power consumption identifier 840 identifies the lower of the first idle power consumption and the second idle power consumption indicated by idle power consumption indicator 830. Possible input state vector selector 850 selects as the input state vector the one of the possible input state vectors that corresponds to the lower idle power consumption identified by the lowest idle power consumption identifier 840.

Although the foregoing example specifically mentions a forward determination and a backward determination as examples of the plurality of determinations performed by determining module 820, the determining module may additionally or alternatively perform various other determinations. In one embodiment, determining module 820 performs a forward determination that begins at a first location in the digital circuit and, as a result, determines the states of the inputs of circuit elements located along a first path through the digital circuit. In such embodiment, determining module 820 also performs a forward determination that begins at a location different the first location. As a result, the determining module determines the states of the inputs of circuit elements located along a path through the digital circuit different from the first path. In another embodiment, determining module 820 performs a backward determination that begins at a first location in the digital circuit and, as a result, determines the states of the inputs of circuit elements located along a first path through the digital circuit. In such embodiment, determining module 820 performs a backward determination that begins at a location different from the first location. As a result, the determining module determines the states of the inputs of circuit elements located along a path through the digital circuit different from the first path. Additionally or alternatively, the determining module can perform determination types other than forward or backward determinations. Thus, the determining module can perform a plurality of determinations of various types as the determinations.

Apparatus 700 may additionally comprise an optional permutation module 960 that identifies logically-permissible input connection alterations 760 applicable to at least one of the circuit elements comprising the digital circuit. Apparatus 700 as described above operates to define an input state vector for application to the circuit inputs of a particular digital circuit. More specifically, apparatus 700 defines an input state vector based upon a received digital circuit descriptor, such as a computer code representation of the digital circuit generated by software sold under the trademark VERILOG® or VHDL®, or generated by software known as SPICE. Permutation module 960 in accordance with the invention identifies logically-permissible input connection alterations that could be made to at least one of the circuit elements of the digital circuit to reduce the idle power consumption of the digital circuit in an idle state when the input state vector is applied to the circuit inputs. Thus, permutation module 960 identifies changes, i.e., logically-permissible input connection alterations, that can be made before the digital circuit is physically fabricated. Such changes will reduce the idle power consumption of the digital circuit in an idle state when the input state vector is applied to the circuit inputs compared to the idle power consumption of the unchanged digital circuit.

Permutation module 960 identifies logically-permissible input connection alterations for at least one of the circuit elements that reduce the idle power value of that circuit element when the digital circuit is in the idle state. The logically-permissible input connection alterations of that circuit element can be applied while maintaining the logic of the digital circuit.

As described above with reference to FIGS. 5, 6A and 6B, altering the input connections of the physical inputs of a circuit element in a digital circuit is possible when various physical input connection arrangements of the circuit element are logically equivalent. More specifically, the physical input connection arrangements of some types of circuit elements can be interchanged without any logical consequence, and the interchange may yield a reduction in the idle power value of that circuit element when the input state vector is applied to the circuit inputs of the digital circuit.

Embodiments of apparatus 700 may be constructed from discrete components, small-scale or large-scale integrated circuits, suitably-configured application-specific integrated circuits (ASICs) and other suitable hardware. Alternatively, embodiments of the apparatus and the modules thereof may be constructed using a digital signal processor (DSP), microprocessor, microcomputer or computer with internal or external memory operating in response to an input state vector defining program fixed in a computer-readable medium in accordance with the invention. A device, such as a DSP, a microprocessor, microcomputer or computer, capable of executing an input state vector defining program will be referred to herein as a computer.

In computer-based embodiments of apparatus 700, the various modules described above may be ephemeral, and may only exist temporarily as the input state vector defining program executes. In such embodiments, the input state vector defining program could be conveyed to the computer on which it is to run by embodying the program in a suitable computer-readable medium, such as a set of floppy disks, a CD-ROM, a DVD-ROM, a read-only memory. Alternatively, the input state vector defining program could be transmitted to such computer by a suitable data link and be stored in a memory device in the computer.

The input state vector defining program causes the computer on which it runs to perform a method for defining an input state vector for application to the circuit inputs of a digital circuit to achieve low idle power consumption. The methods performed by the computer in response to the input state vector defining program are substantially similar to those described above with reference to FIGS. 1, 4 and 5.

Table 3 shows an exemplary pseudo-code that implements an embodiment of the methods shown in FIGS. 1 and 4 to define an input state vector that achieves low power consumption when applied to the circuit inputs of a digital circuit in an idle state.

TABLE 3

Definition of an Input State Vector that Achieves Low Power Consumption When Applied to the Circuit Inputs of a Digital Circuit in an Idle State {
    For every clock-gated combinational block in the digital circuit
    {
        For each output signal in the combinational block TABLE 3-continued Definition of an Input State Vector that Achieves Low Power
Consumption When Applied to the Circuit Inputs of a
Digital Circuit in an Idle State {
    Determine the segment of the circuit that generates
    the output signal;
    {
    For all segments in the circuit (working backwards)
    {
    Choose the segment with the largest number of
    circuit elements;
    Assign input states corresponding to lowest idle
    power to each circuit element starting from the
    output, accounting for logic constraints of the digital
    circuit;
    If the input states corresponding to lowest idle power
    cannot be assigned due to logic conflicts, assign
    input states corresponding to the next-lowest idle
    power;
    Continue till all inputs in the segment are accounted
    for and propagate the outputs to other segments if
    necessary;
    Choose the segment with the next-largest number of
    circuit elements;
    }
    Adopt the states of the inputs of the circuit elements whose
    inputs constitute the circuit inputs as a first possible input
    state vector;
    Compute idle power consumption $P_1$ for first possible input
    state vector;
    For all segments in the circuit (working forwards)
    {
    Choose the segment with the largest number of
    circuit elements;
    Assign input states corresponding to lowest idle
    power to each circuit element starting from the
    circuit inputs, accounting for the logic constraints of
    the digital circuit;
    If input sales corresponding to the lowest idle power
    cannot be assigned due to logic conflicts, assign
    input states corresponding to the next-lowest allowed
    idle power;
    Continue till all inputs in the segment are accounted
    for and propagate the outputs to other segments if
    necessary;
    Choose the segment with the next-largest number of
    circuit elements;
    }
    Adopt the states of the inputs of the circuit elements whose
    inputs constitute the circuit inputs as a second possible input
    state vector;
    Compute a idle power consumption $P_2$ for the second
    possible input state vector;
    }
    If $P_1 < P_2$
        Input state vector = first possible input state vector
    else
        Input state vector = second possible input state vector
    Use presettable and clearable flip-flops to apply the ones and zeros,
    respectively, of the input state vector to the circuit inputs of the
    digital circuit in the idle mode;
}

Digital circuits typically include flip-flops at each circuit input to control the timing with which the input states are applied to the digital circuit. D-type flip-flops with power-on clear are typically employed. Each flip-flop receives respective input states and a clock signal. The input state is applied to the circuit input on, for example, the rising edges of the clock signal.

Digital circuits also typically employ clock gating to set them into idle mode. The clock signal is received via a gate that additionally receives an inverted IDLE control signal. The output of the gate is connected to the clock inputs of the flip-flops and any other circuit elements that need a clock signal. When the IDLE control signal is not asserted, the gate feeds the clock signal to the flip-flops and such other circuit elements. Assertion of the IDLE control signal prevents the gate from feeding the clock signal to the flip-flops and such other circuit elements. The IDLE control signal sets the digital circuit to a static state in which its power consumption is substantially reduced compared with its power consumption during its normal, active state. This static state is called the idle state of the digital circuit in this disclosure.

Figure 9:
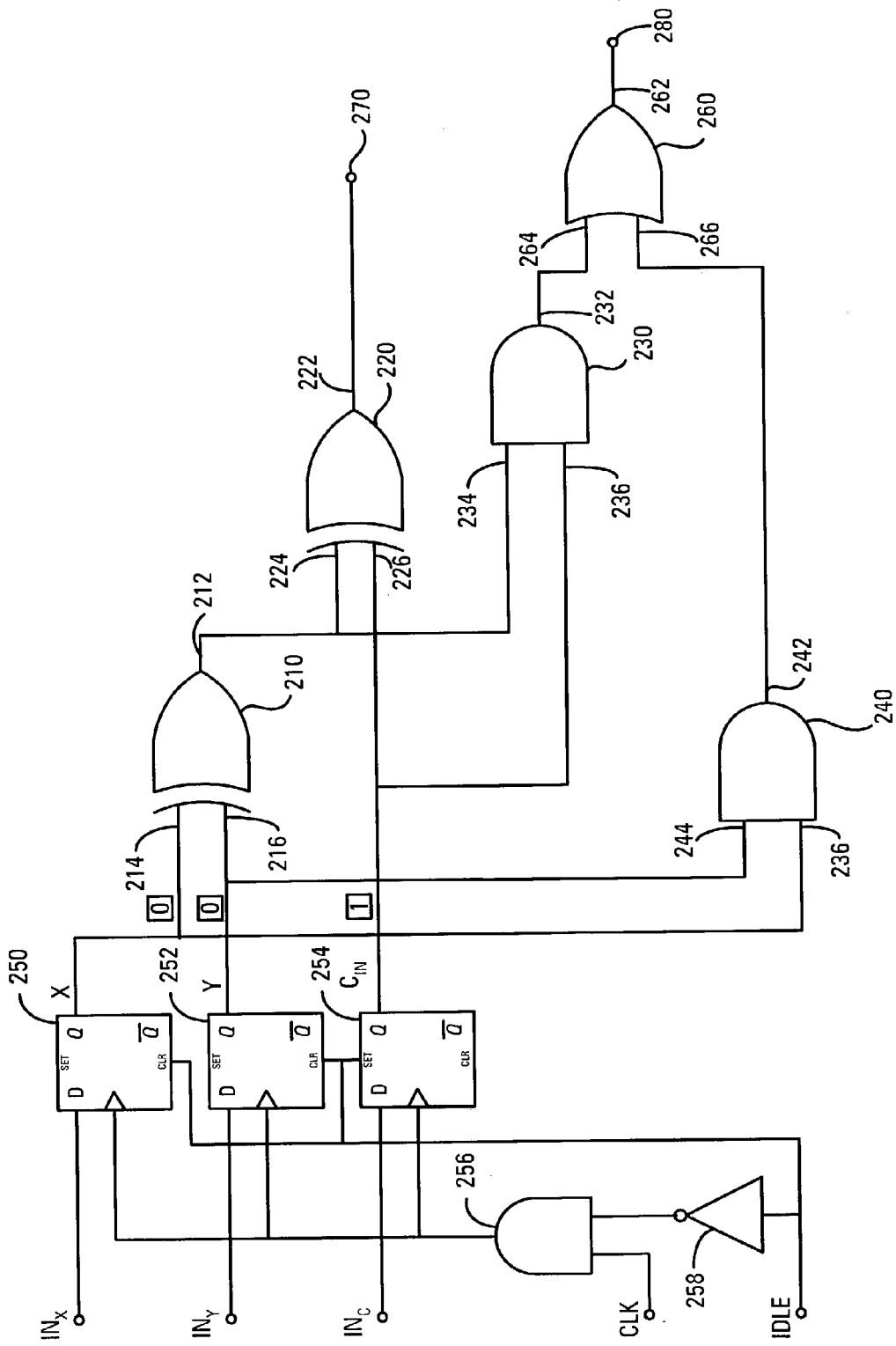
FIG. 9 is a schematic diagram of an exemplary digital circuit illustrating the use of specific types of flip-flops for applying the input state vector to the circuit inputs of the digital circuit.

FIG. 9 is a schematic diagram of the exemplary adder digital circuit 200 shown in FIG. 2 that incorporates presettable and clearable D-type flip-flops 250, 252 and 254 that apply the input state vector to the circuit inputs X, Y and $C_{in}$ of digital circuit 200 to achieve low power consumption when the digital circuit is in the idle state. The type of D-type flip-flop used to apply each state of the input state vector to the respective circuit input depends on the input state to be applied. A clearable D-type flip-flop applies a zero state to the respective circuit input whereas a presettable D-type flip-flop applies a one state to the respective circuit input. Clearable and presettable D-type flip-flop designs exist in typical cell libraries used for designing digital circuits, so the development, characterization and optimization of the flip-flops used to apply the input state vector to the circuit inputs has already been done. In one example, the clear (CLR) and preset (PRE) inputs of the clearable and presettable D-flip-flops are asynchronous, so that applying the IDLE control signal to the clear or preset input of the flip-flop, depending on the type of the flip-flop, sets the Q output of the flip-flop to a zero state or a one state, respectively, regardless of the state of the clock signal. Using presettable and clearable D-type flip-flops to apply the defined input state vector to the circuit inputs has the advantage that no change in design methodology is required to apply the input state vector to the circuit inputs.

FIG. 9 shows an example in which the input state vector (X=0, Y=0, $C_{in}$=1) determined by the example of the method described above with reference to FIG. 2 is applied to the circuit inputs of digital circuit 200. The Q outputs of D-type flip-flops 250, 252 and 254 are connected to the circuit inputs X, Y and $C_{in}$, respectively. To apply the exemplary input state vector X=0, Y=0, $C_{in}$=1, flip-flops 250 and 252, which apply zero states to circuit inputs X and Y, respectively, are clearable D-type flip-flops, and flip-flop 254, which applies a one state to circuit input $C_{in}$ is a presettable D-type flip-flop. The D inputs of the flip-flops are connected to inputs $IN_X$, $IN_Y$ and $IN_C$, respectively. The clock inputs of the flip-flops are connected to the output of gate 256. The clear inputs CLR of flip-flops 250 and 252, the preset input SET of flip-flop 254 and the input of inverter 258 are all connected to receive the IDLE control signal. The output of the inverter is connected to one input of gate 256. The other input of gate 256 is connected to receive clock signal CLK. In an embodiment in which the input state vector (X=0, Y=1, $C_{in}$=1) determined by the example of the method described above with reference to FIG. 3 is applied to the circuit inputs of digital circuit 200, a presettable D-type flip-flop is used instead of a clearable D-type flip-flop as flip-flop 250.

In the active state of digital circuit 200, the IDLE control signal is not asserted. The inverse of the IDLE control signal fed to one input of gate 256 from the output of inverter 258 allows the clock signal CLK to pass through the gate to the clock inputs of flip-flops 250, 252 and 254. As a result, the flip-flops pass input states received at inputs $IN_X$, $IN_Y$ and $IN_C$ to circuit inputs X, Y, and Cin, respectively, on the rising edges, for example, of the clock signal.

Assertion of the IDLE control signal sets digital circuit 200 into its idle state. The inverse of the IDLE control signal fed to one input of gate 256 from the output of inverter 258 causes the gate to prevent the clock signal CLK from passing to the clock inputs of flip-flops 250, 252 and 254. This sets digital circuit 200 to its idle state. Power consumption of digital circuit 200 in the idle state is less than in the active state, but, absent application of the input state vector to the circuit inputs, depends on the operational state of the circuit just before the IDLE control signal was asserted. The IDLE control signal applied to the clear inputs CLR of flip-flops 250 and 252 and to the preset input SET of flip-flop 254 sets the Q outputs of flip-flops 250 and 252 to the zero state and sets the Q output of flip-flop 254 to the one state. This applies the input state vector defined as described above to the circuit inputs X, Y, and Cin of digital circuit 200. The input state vector applied to the circuit inputs achieves low power consumption in digital circuit 200 in the idle mode.

In an example of digital circuit 200 implemented in 0.25 μm CMOS technology, results of a SPICE simulation show that applying the input state vector reduces the idle power consumption by a factor of more than two.

Embodiments according to the invention define an input state vector that achieves low power consumption when applied to the circuit inputs of a digital circuit in an idle state. Such embodiments can be used to define an input state vector applicable to any type of digital circuit, such as digital circuits comprising complementary metal oxide semiconductor (CMOS) transistors. In addition, other embodiments will define an input state vector that achieves low power consumption when applied to the circuit inputs of a digital circuit constructed using any type of switching circuit element, e.g., any transistor type, achieves low power consumption when the digital circuit is in an idle state.

II. Second Method and Apparatus for Defining an Input State Vector that Achieves Low Power Consumption when Applied to the Circuit Inputs of a Digital Circuit in an Idle State The following portion of the disclosure pertains to embodiments of the invention in which independent determinations are performed to define an input state vector that achieves low power consumption when applied to the circuit inputs of a digital circuit in an idle state. The input state vector is composed of more than one input state.

The term determination is used in this disclosure to denote a process that defines a set of input states that achieves low power consumption when applied to the respective circuit inputs of the digital circuit in an idle state. The determinations collectively define all of the input states of the input state vector. The sets of the input states respectively defined by the determinations are composed of input states ranging in number from one to all of the input states of the input state vector.

The phrase applied to the circuit inputs as used in this disclosure does not require physical application: input states can be applied to the circuit inputs in an emulation performed by device such as a computer.

In some digital circuits, each determination defines a respective set of input states composed of different ones of the input states of the input state vector. The sets of input states have no input states in common, and, consequently, conflict in the definitions of the input states by the different determinations does not occur.

In other digital circuits, the sets of input states respectively defined by two or more of the determinations have one or more of the input states in common. Since the determinations are independently performed, conflict can exist in the definitions of the one or more of the input states by two or more of the determinations. In an example in which conflict exists in the definitions of one input state by two of the determinations, one of the determinations defines the input state as 0 and another of the determinations defines the input state as 1.

Accordingly, the invention additionally provides for resolving any conflict in the definitions of any one or more of the input states. Specifically, such conflict is resolved in favor of the definition of the one or more of the input states that achieves the lowest idle power consumption when the input vector that includes the one or more of the input states in accordance with the definition is applied to the circuit inputs of the digital circuit in the idle state. In this disclosure, the adjective lowest, conventionally used to refer to three or more things, will be taken to refer to two or more things, i.e., to encompass in addition the conventional meaning of lower. Conflict resolution processes will be described in further detail below.

The following detailed description of the embodiments of the invention claimed herein will frequently refer to the detailed description set forth above with reference to FIGS. 1–9. That is, much of the above-described detailed description explicitly and fully describes, and is pertinent to, portions of the method and system of the present embodiments for performing independent determinations to define an input state vector that achieves low power consumption when applied to the circuit inputs of a digital circuit in an idle state.

Figure 10A:
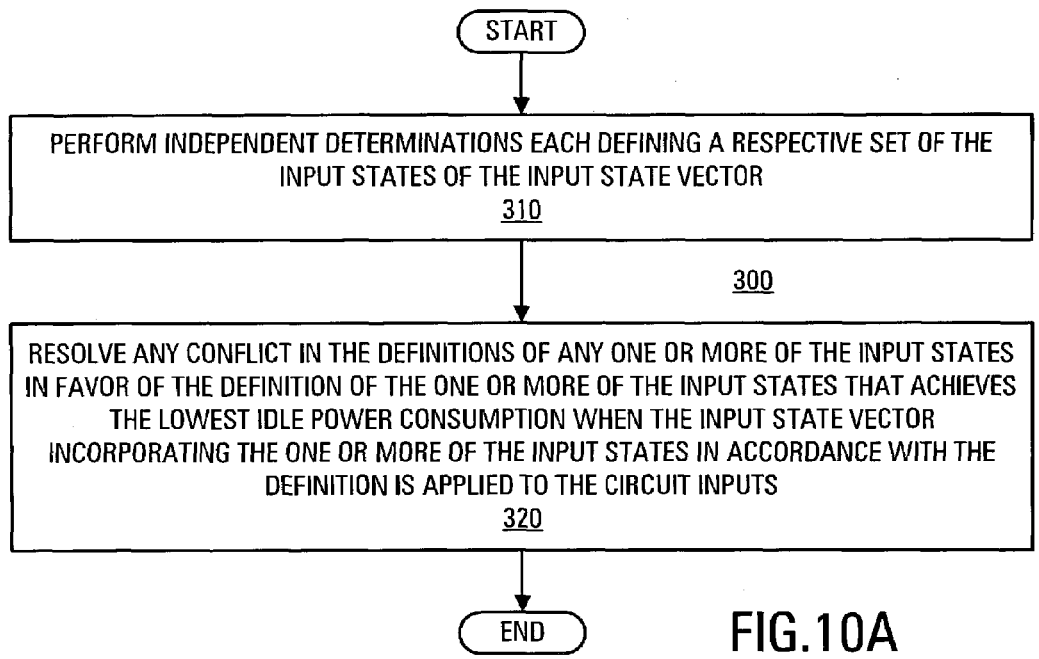
FIG. 10A is a flow diagram illustrating a first embodiment of a method in accordance with the invention for defining an input state vector by performing independent determinations that define respective sets of the input states of the input state vector.

FIG. 10A is a flow diagram illustrating a first embodiment of a method 300 in accordance with the invention for determining an input state vector that achieves low power consumption when applied to the circuit inputs of a digital circuit in an idle state. In method 300, in block 310, independent determinations are performed. Each determination defines a respective set of the input states of the input state vector. In block 320, any conflict in the definitions of any one or more of the input states by two or more of the determinations is resolved in favor of the definition of the one or more of the input states that achieves the lowest idle power consumption when the input state vector that includes the one or more of the input states in accordance with the definition is applied to the circuit inputs.

Figure 10B:
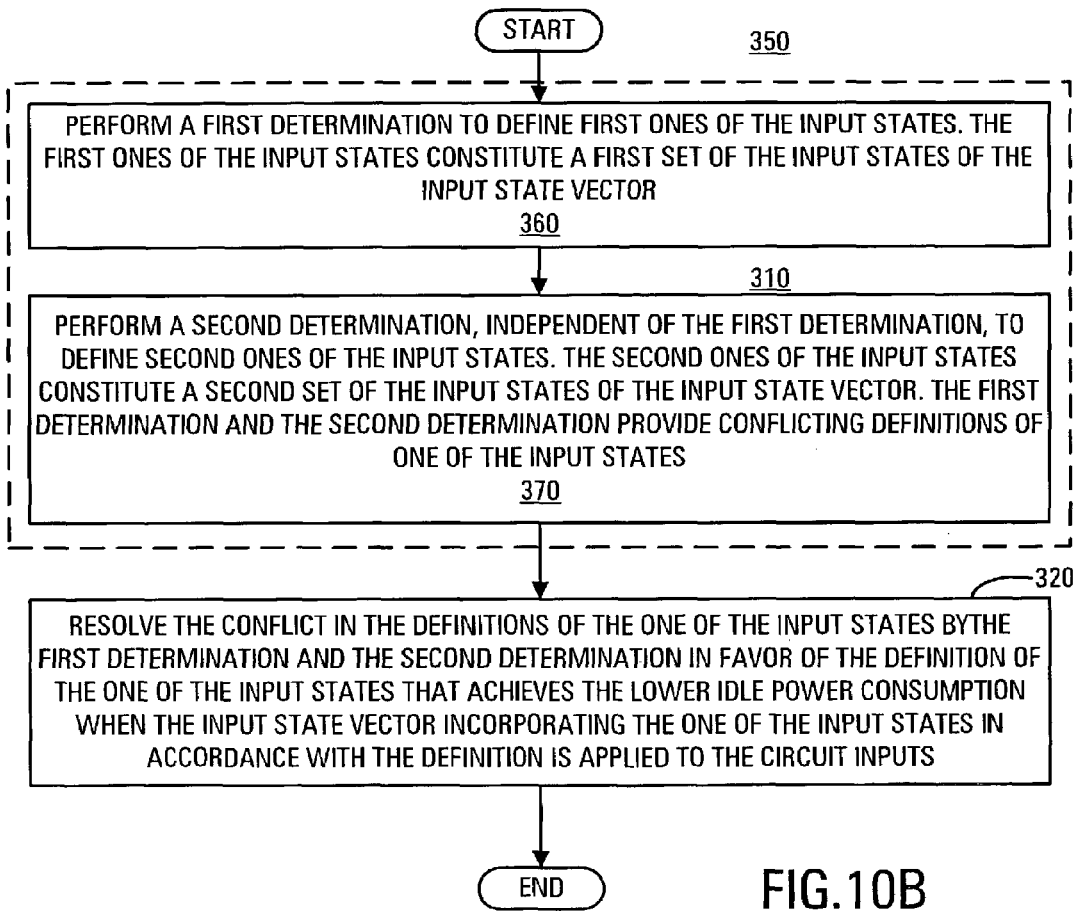
FIG. 10B is a flow diagram illustrating a second embodiment of a method in accordance with the invention for defining an input state vector by performing independent determinations that define respective sets of the input states of the input state vector.

FIG. 10B is a flow diagram illustrating an example 350 of the method 300 described above with reference to FIG. 10A. In method 350, blocks 360 and 370 constitute an exemplary embodiment of block 310 of method 300 and block 380 constitutes an exemplary embodiment of block 320 of method 300.

In block 360, a first determination is performed to define first ones of the input states of the input state vector. The first ones of the input states constitute a first set of the input states of the input state vector.

In block 370, a second determination, independent of the first determination, is performed to define second ones of the input states of the input state vector. The second ones of the input states constitute a second set of the input states of the input state vector. In this example, the first determination and the second determination provide conflicting definitions for one of the input states.

In block 380, the conflict in the definitions of the one of the input states by the first determination and the second determination is resolved in favor of the definition of the one of the input states that achieves the lower idle power consumption when the input state vector incorporating the one of the input states in accordance with the definition is applied to the circuit inputs.

Method embodiment 300 and, specifically, example 350, will be described in more detail next with reference to FIGS. 11A–11D.

Figure 11A:
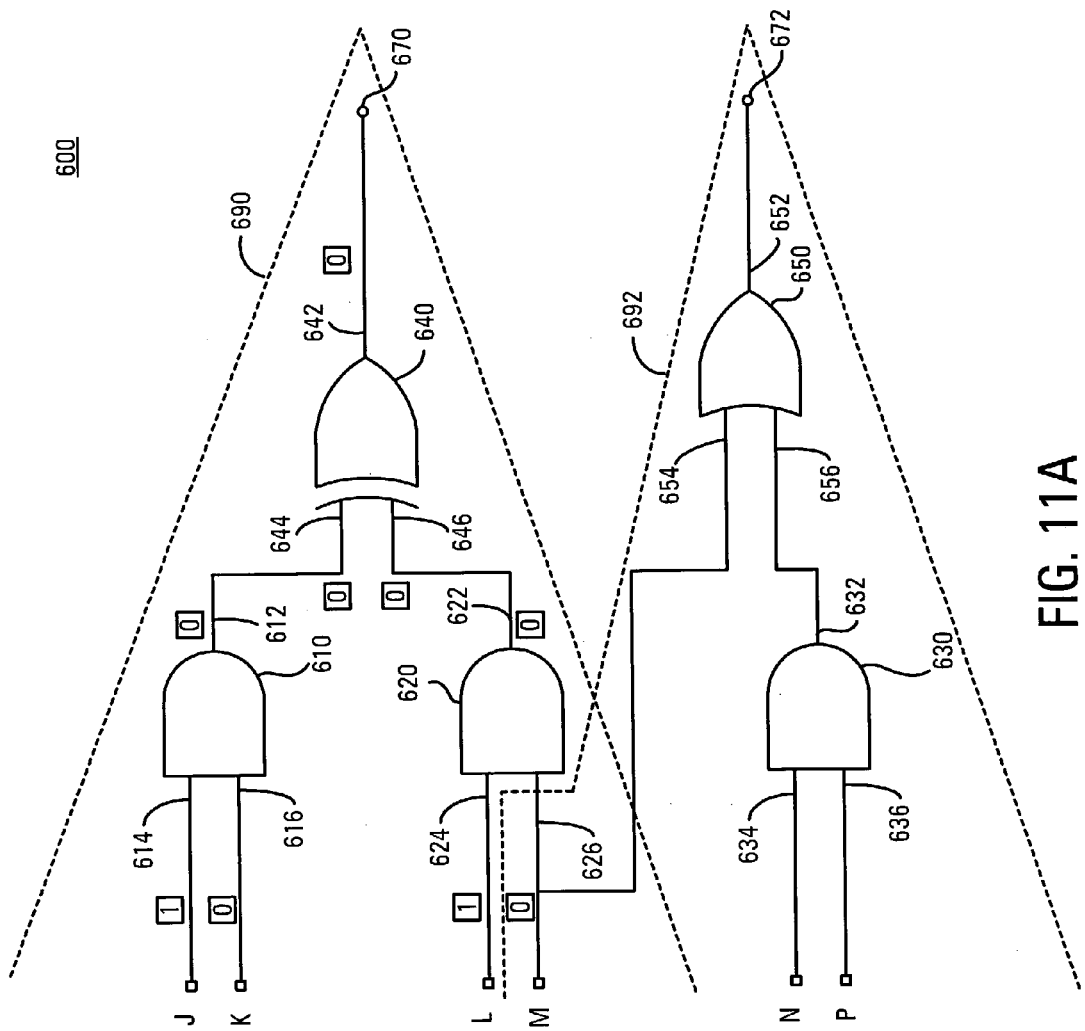
FIG. 11A is a schematic diagram of an exemplary digital circuit illustrating how a first determination in accordance with embodiments of the invention defines a first set of the input states of the input state vector.

FIG. 11A is a schematic diagram of an exemplary digital circuit 600 that will be used to illustrate use of the method embodiment 300 and, specifically, the example 350 to define the input state vector. Exemplary digital circuit 600 is composed of circuit elements 610, 620, 630, 640 and 650 electrically interconnected as shown. The circuit inputs of digital circuit 600 are labeled J, K, L, M, N and P and the circuit outputs of the digital circuit are labeled 670 and 672. Digital circuit 600 is merely an example of a digital circuit for which an input state vector can be defined by the method or apparatus in accordance with the invention: an input state vector can be defined by the method or apparatus in accordance with the invention for any digital circuit comprised of any number of circuit elements of any number of circuit element types with any number of inputs, and fabricated by any fabrication process.

The circuit elements of circuit 600 are of three circuit element types, namely, AND gate (AND gates 610, 620, and 630), XOR gate (XOR gate 640) and OR gate (OR gate 650). As was described above with reference to FIGS. 2 and 3, simulations are performed on circuit elements of the three circuit element types to find the idle power values for each possible combination of states of the inputs of the circuit elements. The idle power values shown in Table 1 and Table 2 are applicable to the circuit element types of digital circuit 600.

Referring to FIG. 10A, in block 310, method embodiment 300 in accordance with the invention performs independent determinations each of which defines a respective set of the input states of the input state vector. Referring to FIG. 10B, in block 360, example 350 in accordance with the invention performs a first determination to define first ones of the input states of the input state vector. The first ones of the input states constitute a first set of the input states of the input state vector. Referring now to FIG. 11A, in one embodiment in accordance with the invention, the first determination performed in block 310 or in block 360 is a backward determination performed on a first segment 690 of digital circuit 600. As described above with reference to FIG. 3, a backward determination begins by determining input states for circuit elements closest to the circuit outputs 670 and 672 and then works backwards through the digital circuit 600 along a path that extends towards the circuit inputs J, K, L, M, N and P. The input states defined for circuit inputs J, K, L, M, N and P define the input state vector.

In digital circuit 600, the first determination performed in segment 690 and starting at circuit output 670 determines a first set of the input states of the input state vector. More specifically, the first determination performed in segment 690 defines input states for application to circuit inputs J, K, L and M, respectively, and does not define input states for application to circuit input N or circuit input P. To simplify the disclosure, an input state for application to circuit input X will be called input state X. Thus, the first set of input states defined by the first determination is composed of input states J, K, L and M.

Although the first determination is a backward determination in the described embodiment, other embodiments of the invention perform other types of determination as the first determination that defines the first set of the input states of the input state vector. For example, a forward determination may be performed as the first determination. In other embodiments, the sets of the input states of the input state vector are each defined by beginning the respective determination at different starting points in the digital circuit. Thus, the invention is not limited to the exemplified types of determination. The exemplified backward determination is merely an example of the manner in which the first determination can be performed to define a first set of the input states. Other embodiments in accordance with the invention may employ various other types of determination to define the first set of the input states.

In one embodiment, one of the determinations is a forward determination that begins at a first location in the digital circuit and, as a result, proceeds through the digital circuit along a first path that extends away from the circuit inputs, and another of the determinations is a forward determination that begins at a second location in the digital circuit, different from the first location, and, as a result, proceeds through the digital circuit along a path different from the first path.

In another embodiment, one of the determinations is a backward determination that begins at a first location in the digital circuit and proceeds through the digital circuit along a first path that extends towards the circuit inputs, and another of the determinations is a backward determination that begins at a second location in the digital circuit, different from the first location and, as a result, proceeds through the digital circuit along a path different from the first path.

Additionally, determinations other than simple forward or backward determinations can be employed in block 310 of FIG. 10A and in blocks 360 and 370 of FIG. 10B. For example, a determination may comprise both a forward determination and a backward determination as in the example described above with reference to FIGS. 2 and 3. Thus, it will be understood that embodiments of the method in accordance with the invention can perform various types of determinations in blocks 310, 360 and 370.

In the digital circuit shown in FIG. 11A, two segments, i.e., segment 690 and segment 692, logically evolve in the backward determinations starting at circuit outputs 670 and 672, respectively. Segment 690 and segment 692 are referred to as fan-in cones. Other embodiments of the invention can define the sets of input states using various types of segmentation other than fan-in cones. For example, the portion of the digital circuit located between any subset of outputs that ultimately couple to a subset of the circuit inputs and the subset of the circuit inputs can be regarded as a segment. In another example, a fan-in cone can be divided into sub-fan-in cones, each of which can be regarded as a segment.

Some embodiments of the invention perform a segmentation process before performing the determinations that define respective sets of the input states of the input state vector. In such an embodiments, the determinations define respective sets of the input states of the input state vector corresponding to the pre-determined segments. The invention is not limited to determinations that define respective sets of the input states of the input state vector for a digital circuit segmented in any particular way or even for a digital circuit that is segmented at all. In embodiments in which the digital circuit is not segmented, references to segment should be taken to refer to the entire digital circuit.

In the present example, the first determination performs a backward determination in a manner similar to that described above with reference to FIG. 3 to determine a first set of input states for the segment 690 that includes circuit elements 610, 620 and 640. Using the idle power values shown in Table 2, the first determination first determines that the input state combination giving the lowest idle power value for XOR gate 640 is (A=0, B=0). With such input states applied to the inputs 644 and 646 of XOR gate 640, the output 642 of XOR gate 640 has a state of 0.

The first determination next determines the input states for AND gate 610. Table 2 shows that, of the four available input state combinations, the input state combination of (A=1, B=1) results in the lowest idle power value. However, the first determination accounts for the logic function of XOR gate 640 by realizing that the output 612 of AND gate 610, which is connected to the input 644 of XOR gate 640, has been previously determined by the first determination to have a state of 0. Thus, the input states of AND gate 610 must be ones that set output 612 to a state of 0. Any one of input state combinations (A=0, B=0), (A=0, B=1) and (A=1, B=0) applied to the inputs 614 and 616 of AND gate 610 will set output 612 to a state of 0. However, according to Table 2, the input state combination (A=1, B=0) results in the lowest allowable idle power value for AND gate 610. Thus, the first determination determines input states (A=1, B=0) for the inputs 614 and 616 of AND gate 610. Inputs 614 and 616 constitute the circuit inputs J and K, respectively, of digital circuit 600.

The first determination next determines the input states of AND gate 620. Table 2 again shows that, of the four available input state combinations, the input state combination of (A=1, B=1) results in the lowest idle power value. However, the first determination accounts for the logic function of XOR gate 640 by realizing that the output 622 of AND gate 620, which is connected to the input 646 of XOR gate 640, has been previously determined by the first determination to have a state of 0. Thus, the input states of AND gate 620 must be ones that set output 622 to a state of 0. Any one of input states (A=0, B=0), (A=0, B=1) and (A=1, B=0) applied to the inputs 624 and 626 of AND gate 620 will set output 622 to a state of 0. However, according to Table 2, the input state combination (A=1, B=0) results in the lowest allowable idle power value for AND gate 620. Thus, the first determination determines input states (A=1, B=0) for the inputs 624 and 626 of AND gate 620. Inputs 624 and 626 constitute the circuit inputs L and M, respectively, of digital circuit 600.

Thus, the first determination, i.e., the backward determination applied to segment 690, has defined a first set of the input states of the input state vector. Specifically, the first determination has defined the first set of input states J, K, L and M in which J=1, K=0, L=1 and M=0.

In block 310 of FIG. 10A or block 370 of FIG. 10B, a second determination, independent of the first determination, is performed to define second ones of the input states. The second ones of the input states constitute a second set of the input states of the input state vector. In this example, the first determination and the second determination provide conflicting definitions of one of the input states, namely, the definition of input state M. The second determination defines the second set of input states independently of, and without reference to, the input states defined by the first determination. That is, unlike the embodiments described above with reference to FIGS. 1–9, the input states defined by the first determination are not considered by, and do not constitute logical constraints on, the second determination.

For example, in the above description referring to FIG. 3, the backward determination applied to segment 295 determines input states for circuit inputs 244 and 246 of circuit element 240 and, hence, input states X and Y. Input states X and Y then provide logical constraints during the subsequent backward determination applied to segment 290. In contrast, in embodiments in accordance with the invention, the determinations, e.g., the first determination and the second determination, are performed independently of each other and the input states defined by one determination do not constitute logical constraints when another determination is performed. Thus, the methods in accordance with the invention independently determine respective sets of the input states of the input state vector using at least two determinations. Although only two determinations are performed in the example described above with reference to FIG. 10B, other embodiments in accordance with the invention perform more than two determinations.

Figure 11B:
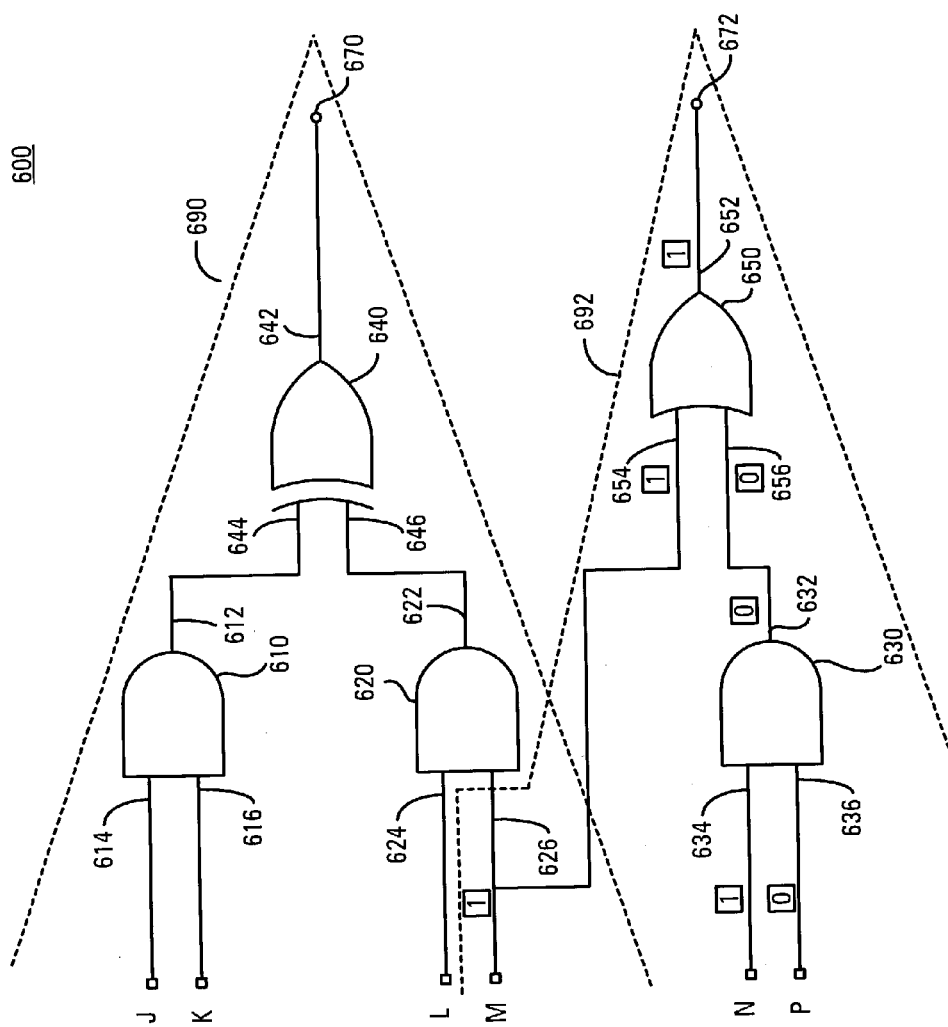
FIG. 11B is a schematic diagram showing how a second determination in accordance with embodiments of the invention defines a second set of the input states of the input state vector for the exemplary digital circuit shown in FIG. 11A.
Figure 11C:
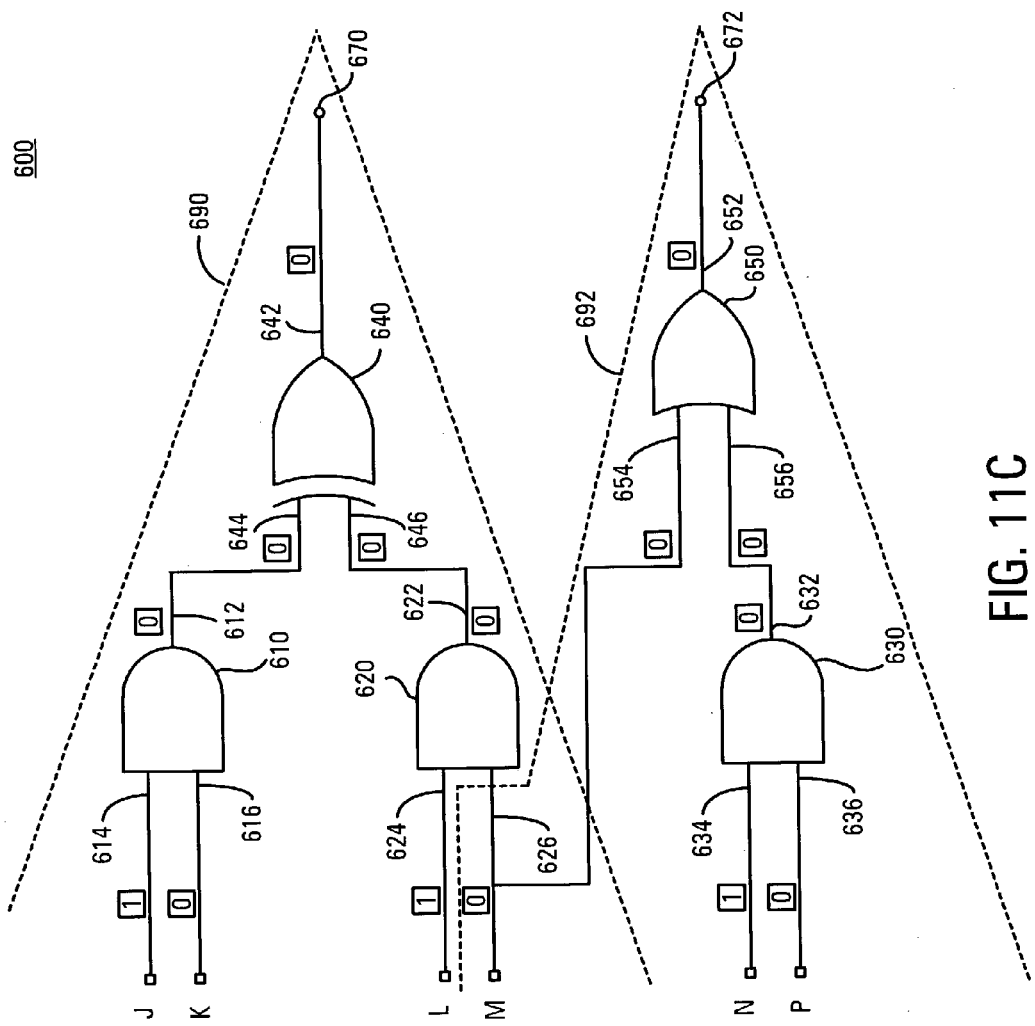
FIG. 11C is a schematic diagram showing the input state vector with a conflictingly-defined input state as defined in accordance with embodiments of the invention by the first determination applied to the circuit inputs of the exemplary digital circuit shown in FIG. 11A.
Figure 11D:
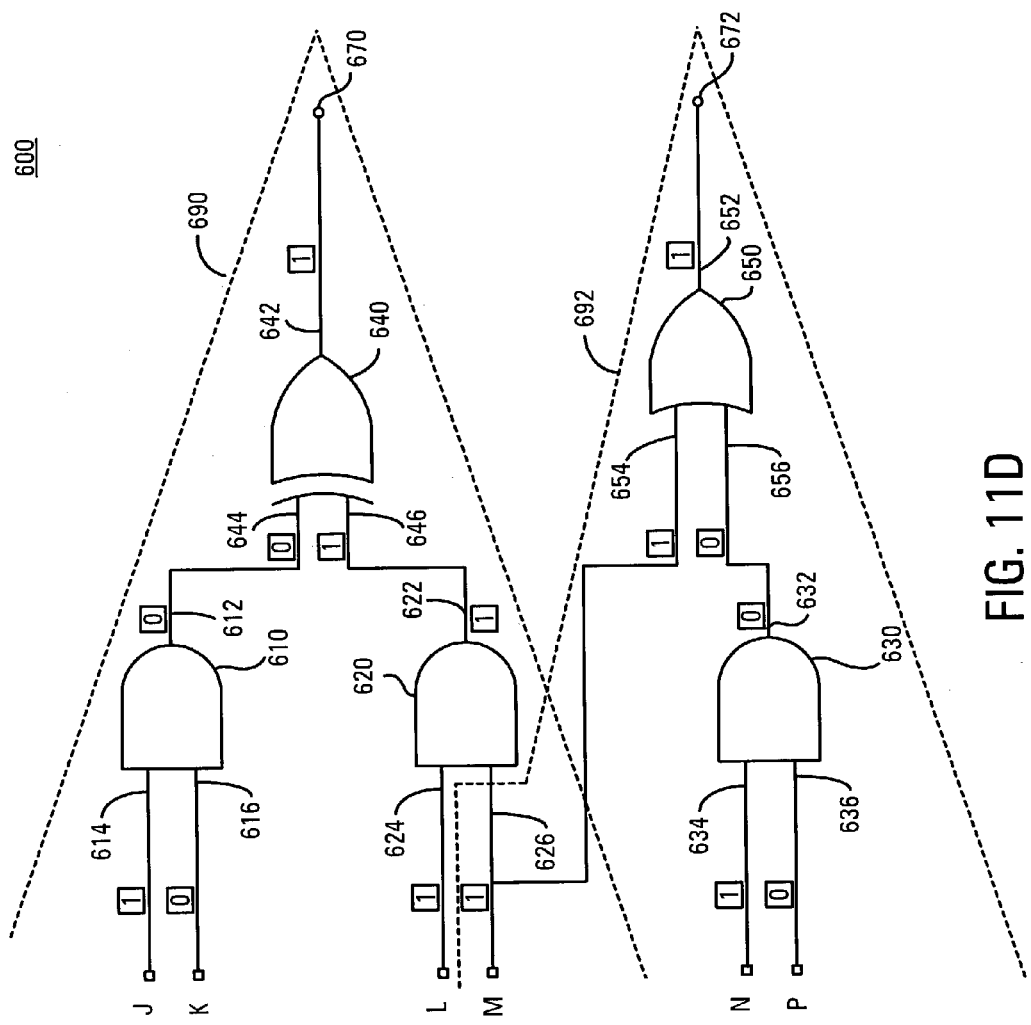
FIG. 11D is a schematic diagram showing the input state vector with the conflictingly-defined input state as defined in accordance with embodiments of the invention by the second determination applied to the circuit inputs of the exemplary digital circuit shown in FIG. 11A.

FIG. 11B is a schematic diagram showing how the second determination in accordance with an exemplary embodiment of the invention defines the second set of the input states of the input state vector for the exemplary digital circuit shown in FIG. 11A. In the example shown, the second determination is a backward determination applied to a second segment 692 of digital circuit 600. The backward determination is performed in a manner similar to that described above with reference to FIG. 3 to determine input states for circuit elements 650 and 630, and additionally for input 626 of circuit element 620.

First, using the values of Table 2, the second determination determines that the input state combination giving the lowest idle power value for OR gate 650 is (A=1, B=0). With such input states applied to the inputs 654 and 656 of OR gate 650, the output 652 of OR gate 650 has a state of 1.

The second determination next determines the input states of AND gate 630. Table 2 shows that, of the four available input state combinations, the input state combination of (A=1, B=1) results in the lowest idle power value. However, the second determination accounts for the logic function of OR gate 650 by realizing that the output 632 of AND gate 630, which is connected to the input 656 of OR gate 650, has been previously determined by the second determination to have an input state of 0. Thus, the input states of AND gate 630 must be ones that set output 632 to a state of 0. Any one of input state combinations (A=0, B=0), (A=0, B=1) and (A=1, B=0) applied to the inputs 634 and 636 of AND gate 630 will set output 632 to a state of 0. However, according to Table 2, the input state combination of (A=1, B=0) results in the lowest allowable idle power value for AND gate 630. Thus, the second determination determines input states (A=1, B=0) for the inputs 634 and 636 of AND gate 630.

The second determination next determines the input state of the input 626 of AND gate 620. Table 2 again shows that, of the four available input state combinations, the input state combination of (A=1, B=1) results in the lowest idle power value. However, the second determination accounts for the logic function of OR gate 650 by realizing that the input 626 of AND gate 620, which is connected to the input 654 of OR gate 650, has been previously determined by the second determination to have an input state of 1. Thus, the second determination determines an input state of (B=1) for the input 626 of AND gate 620.

Thus, the second determination determines input states of (A=1, B=0) for the inputs 634 and 636 of AND gate 630 and an input state (B=1) for the input 626 of AND gate 620. Inputs 626, 634 and 636 constitute the circuit inputs M, N and P, respectively, of digital circuit 600. Accordingly the second determination has defined a second set of input states M, N and P in which M=1, N=1 and P=0.

As noted above, the second determination that defines the second set of input states M, N and P is performed without taking any account of the first set of input states defined by the first determination. The input states defined by the first determination are not considered and do not constitute logical constraints on the second determination. Specifically, the definition by the first determination of input state M, i.e., the state of the input 626 of AND gate 620, was not considered and did not provide a logical constraint during the definition made by the second determination of input state M.

Thus, the second determination, i.e., the backward determination applied to segment 692, has defined a second set of the input states of the input state vector. More specifically, the second determination has defined a set of input states composed of input states M, N and P. The first set and the second set collectively define all the input states that constitute the input state vector, i.e., input states J, K, L, M, N and P.

When the method example 350 in accordance with the invention is applied to some digital circuits, the first determination and the second determination define different ones of the input states, the first set of input states defined by the first determination and the second set of input states defined by the second determination collectively and unambiguously define the input state vector.

When the method example 350 in accordance with the invention is applied to other digital circuits, the first determination and the second determination both provide definitions of the same one or more input states, and both determinations provide the same definition of such one or more input states. In this case, no conflict exists in the definitions of the one or more input states by both the first determination and the second determination, and the first set of input states defined by the first determination and the second set of input states defined by the second determination collectively and unambiguously define the input state vector.

However, when the method example 350 in accordance with the invention is applied to yet other digital circuits, such as the exemplary digital circuit 600 described above with reference to FIGS. 11A and 11B, conflict exists in the definitions by the first determination and the second determination of input state M. As shown in FIG. 11A, the first determination defines this input state by determining an input state of 0 for the input 626 of AND gate 620. As shown in FIG. 11B, the second determination defines this input state by determining an input state of 1 for the input 626 of AND gate 620. Thus, the definitions of input state M by the first determination (M=0) and by the second determination (M=1) conflict.

The conflict in the definitions of input state M has to be resolved to enable the first set and the second set of the input states of the input state vector to unambiguously define the input state vector. In block 320 of FIG. 10A and in block 380 of FIG. 10B, the conflict in the definitions of input state M is resolved in favor of the definition of input state M that achieves the lower idle power consumption when the input state vector incorporating input state M in accordance with the definition is applied to the circuit inputs. More particularly, the definition of input state M that achieves the lower idle power consumption when the input state vector incorporating input state M in accordance with the definition is applied to the circuit inputs defines input state M in the input state vector. The remaining input states of the input state vector are defined by the remaining input states in the first set and the second set of the input states. It should be noted that, when conflict exists in the definitions of a single input state, performing more than two determinations results in only two differing definitions of the single input state since each input state has only two possible states. When conflict exists in the definitions of multiple input states, performing more than two determinations can result in more than two differing definitions of the input states.

In a quantitative example of the processing performed in block 380 when method example 350 is applied to the circuit 600 shown in FIG. 11A, the idle power consumption of the digital circuit 600 is calculated with a first input state vector applied to its circuit inputs. In the first input state vector, input state M is as defined by the first determination. The remaining input states are defined as described above. The first input state vector thus applies an input state of 0 to circuit input M. With the first input state vector applied to the circuit inputs of digital circuit 600, the inputs and outputs of the circuit elements of the digital circuit have the states shown in FIG. 11C.

To calculate the idle power consumption of the digital circuit, the method refers to Table 2 to determine the idle power consumption for circuit elements 610, 620, 640, 630 and 650 with respective input states resulting from applying the first input state vector to the circuit inputs. The idle power consumption of the digital circuit is calculated by summing the idle power consumptions of the individual circuit elements:

$$P_{\text{(First Input State Vector (M=0))}} = 15{,}590 + 15{,}590 + 704 + 15{,}590 + 16{,}680 \text{ pW}$$

$$= 64{,}154 \text{ pW}.$$

The idle power consumption of the digital circuit is additionally calculated as just described with a second input state vector applied to its circuit inputs. The second input state vector differs from the first input state vector in that input state M is as defined by the second determination. The second input state vector thus applies an input state of 1 to circuit input M. With the second input state vector applied to the circuit inputs of digital circuit 600, the inputs and outputs of the circuit elements of the digital circuit have the states shown in FIG. 11D.

The idle power consumption of the digital circuit is calculated by summing the idle power consumptions of the individual circuit elements:

$$P_{\text{(Second Input State Vector (M=1))}} = 15{,}590 + 7{,}250 + 28{,}910 + 15{,}590 + 550 \text{ pW}$$

$$= 67{,}890 \text{ pW}.$$

In this quantitative example, applying the first input state vector to the circuit inputs achieves the lower of the two idle power consumptions. Hence, the conflict in the definitions by the first determination and the second determination of input state M is resolved in favor of the definition by the first determination of input state M, i.e., M=0. With the first input state vector that applies an input state of 0 to circuit input M applied to the circuit inputs, digital circuit 600 has lower idle power consumption than with the second input state vector applied to its circuit inputs. The second input state vector applies an input state of 1 to circuit input M. As a result, the first input state vector is adopted as the input state vector for subsequent application to the circuit inputs of digital circuit 600 in an idle state. Thus, in this example, the method resolves the conflict in the definitions of input state M in favor of the definition of input state M=0 and uses this definition of input state M as part of the definition of the input state vector. As a result, the input state vector is defined as (J=1, K=0, L=1, M=0, N=1 and P=0).

Some exemplary conflict resolution processes in accordance with the invention will now be described for use with digital circuits in which the determinations provide conflicting definitions for more than one of the input states. The exemplary conflict resolution processes may be used alone or in combination.

In a first exemplary conflict resolution process, conflict in the definitions of one or more of the input states is resolved in favor of the definition of the one or more of the input states that achieves the lowest idle power consumption when the input state vector incorporating the one or more input states in accordance with the definition is applied to said circuit inputs. This may be implemented by calculating the idle power consumption of the digital circuit with different possible input state vectors applied to the circuit inputs. Each possible input state vector incorporates the conflictingly-defined input states as defined by a different one of the determinations. The remaining input states, if any, of the possible input vectors are those that are defined without conflict. The idle power consumption of the digital circuit may be calculated using the process exemplified above. The possible input state vector that achieves the lowest idle power consumption when applied to the circuit inputs of the digital circuit in the idle state is adopted as the input state vector.

Figure 10C:
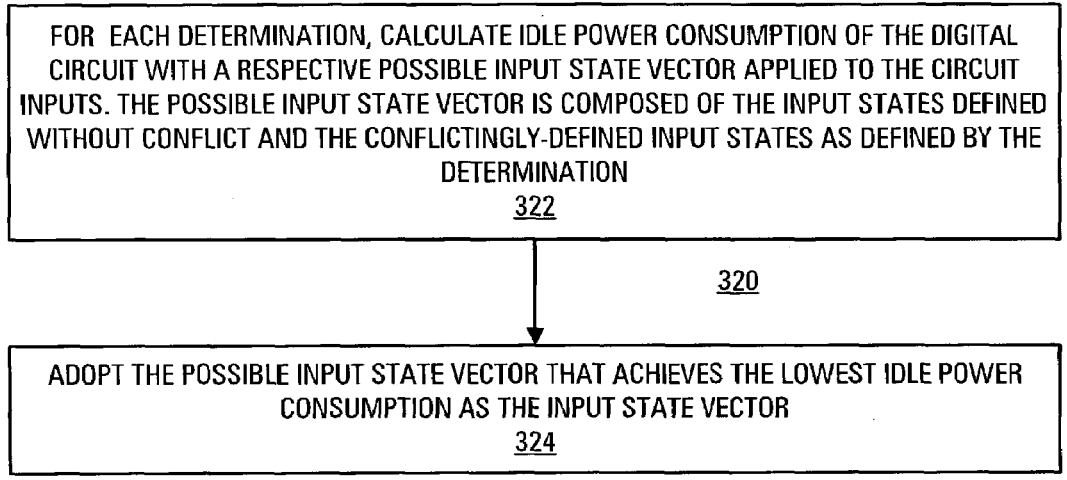
FIG. 10C is a flow diagram illustrating a first exemplary conflict resolution process in accordance with the invention.

An implementation of the first exemplary conflict resolution process, which is an embodiment of block 320 shown in FIG. 10A, is illustrated in FIG. 10C. In block 322, for each determination, the idle power consumption of digital circuit is calculated with a respective possible input state vector applied to the circuit inputs. The possible input state vector is composed of the input states that are defined without conflict and the conflictingly-defined input states as defined by the determination. Then, in block 324, the possible input state vector that achieves the lowest idle power consumption is adopted as the input state vector.

In an example in which only two determinations are performed, two idle power consumptions are calculated, one with a first possible input state vector applied to the circuit inputs, and another with a second possible input state vector applied to the circuit inputs. The first possible input state vector is composed of the input states that both determinations define without conflict and the conflictingly-defined input states as defined by the first determination. The second possible input state vector is composed of the input states that both determinations define without conflict and the conflictingly-defined input states as defined by the second determination. The possible input state vector that achieves the lower idle power consumption is adopted as the input state vector.

For example, in a circuit having seven circuit inputs J, K, L, M, N, P and Q, in which the first determination defined a first set of input states composed of input states J, K, L and M defined as 1, 0, 1 and 0, respectively, and the second determination defined a second set of input states composed of input states L, M, N, P and Q defined as 0, 1, 0, 1 and 1, respectively. Thus, both determinations define input states J, K, N, P and Q (i.e., J=1 K=0, N=0, P=1 and Q=1) without conflict. However, the determinations provide conflicting definitions of input states L and M. In this case, since two determinations were performed, there are two possible input state vectors for application to the circuit inputs. The possible input state vectors are as follows:

First: JK LM NPQ=10 10 011
Second: JK LM NPQ=10 01 011.

The possible input state vector that achieves the lower idle power consumption when applied to the circuit inputs of the digital circuit in the idle state is adopted as the input state vector. In the first conflict resolution process, the number of idle power consumption calculations performed is equal to the number of determinations performed. The conflict resolution process described above with reference to FIGS. 11C and 11D is also an example of the first exemplary conflict resolution process in which a conflict exists in the definition of only one of the input states.

In a second exemplary conflict resolution process, the conflict in the definitions of at least two of the input states is resolved in favor of the combination of the input states that achieves the lowest idle power consumption when the input state vector incorporating the input states in accordance with the combination is applied to said circuit inputs. In an implementation, the idle power consumption of the digital circuit is also calculated with different possible input state vectors applied to the circuit inputs. However, each possible input state vector incorporates a different combination of the conflictingly-defined input states. The remaining input states, if any, of the possible input vectors are those that the determinations define without conflict. The idle power consumption of the digital circuit may be calculated using the process exemplified above. The possible input state vector that achieves the lowest idle power consumption when applied to the circuit inputs of the digital circuit in the idle state is adopted as the input state vector.

Figure 10D:
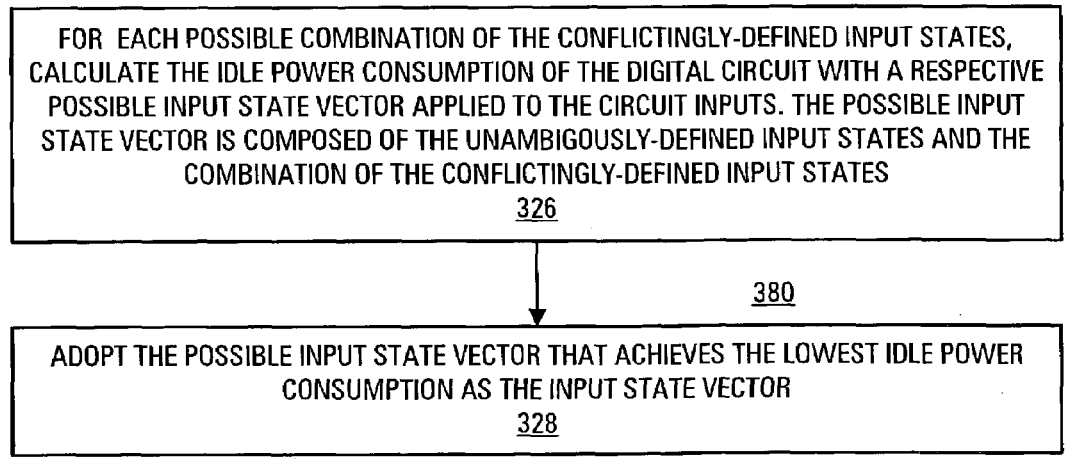
FIG. 10D is a flow diagram illustrating a second exemplary conflict resolution process in accordance with the invention.

An implementation of the second exemplary conflict resolution process, which is also an embodiment of block 320 shown in FIG. 10A, is illustrated in FIG. 10D. In block 324, for each possible combination of the conflictingly-defined input states, the idle power consumption of the digital circuit is calculated with a respective possible input state vector applied to the circuit inputs. The possible input state vector is composed of the input states that are defined without conflict and the combination of the conflictingly-defined input states. Then, in block 328, the possible input state vector that achieves the lowest idle power consumption when applied to the circuit inputs of the digital circuit in the idle state is adopted as the input state vector.

In an example in which conflict exists in the definitions of only two of the input states (the number of determinations is immaterial in the second exemplary conflict resolution process), the two conflictingly-defined input states have four possible combinations, i.e., (0, 0), (0, 1), (1, 0) and (1, 1). Hence, four idle power consumptions are calculated, one with each of a first through a fourth possible input state vector applied to the circuit inputs. Each possible input state vector is composed of the input states that the determinations define without conflict and a different one of the four combinations of the conflictingly-defined input states. The possible input state vector that achieves the lowest idle power consumption is adopted as the input state vector.

In the above example of the digital circuit with seven circuit inputs, the four possible input state vectors are as follows:

First: JK LM NPQ=10 00 011
Second: JK LM NPQ=10 01 011
Third: JK LM NPQ=10 10 011
Fourth: JK LM NPQ=10 11 011.

The possible input state vector that achieves the lowest idle power consumption is adopted as the input state vector.

The choice of which of the two exemplary conflict resolution processes to use depends on a trade-off between obtaining an input state vector that achieves the lowest possible (as opposed to low) idle power consumption and the amount of computational power required to define such input state vector. In an example in which two determinations are performed and the determinations conflictingly define N of the input states, the conflict resolution process resolves the conflicts by comparing the idle power consumptions resulting from the application of anywhere between two input state vectors and $2^N$ input state vectors to the circuit inputs. The number of idle power consumptions compared is a metric of the computational power required. With the simple examples set forth above, the difference in computational power required is trivial. With the method applied to considerably more complex digital circuits, the amount of computational power required to implement the second conflict resolution process rapidly becomes impractically large as N increases. Moreover, in many digital circuits, the second conflict resolution may not define an input state vector that achieves an idle power consumption significantly below that achieved by the input state vector defined by the more computationally-efficient first conflict resolution process.

In a third exemplary conflict resolution process, conflict resolution processes numbering one fewer than the determinations are consecutively performed. The set of input state vectors defined by one of the determinations is defined as an aggregate input state set. Then, a conflict resolving sequence is performed for each of the remaining sets of input states as a current input state set. In the sequence, any conflict in the definitions of any one or more of the input states in the aggregate input state set and the current input state set are resolved in favor of the definition of the one or more of the input states that achieves the lowest idle power consumption when the aggregate input state set and the current input state set with the one or more of the input states in accordance with the definition are applied to respective ones of the circuit inputs. The current input state set is inserted into the aggregate input state set to form a conflict-resolved input state set in which the one or more of the input states are in accordance with the definition. The conflict-resolved input state set is then defined as the aggregate input state set for use the next performance (if any) of the conflict resolution sequence.

Either of the first or the second conflict resolution process described above, or another conflict resolution process, may be used to resolve any conflict in the definitions of the input states in the aggregate input state set and the current input state set.

Figure 10E:
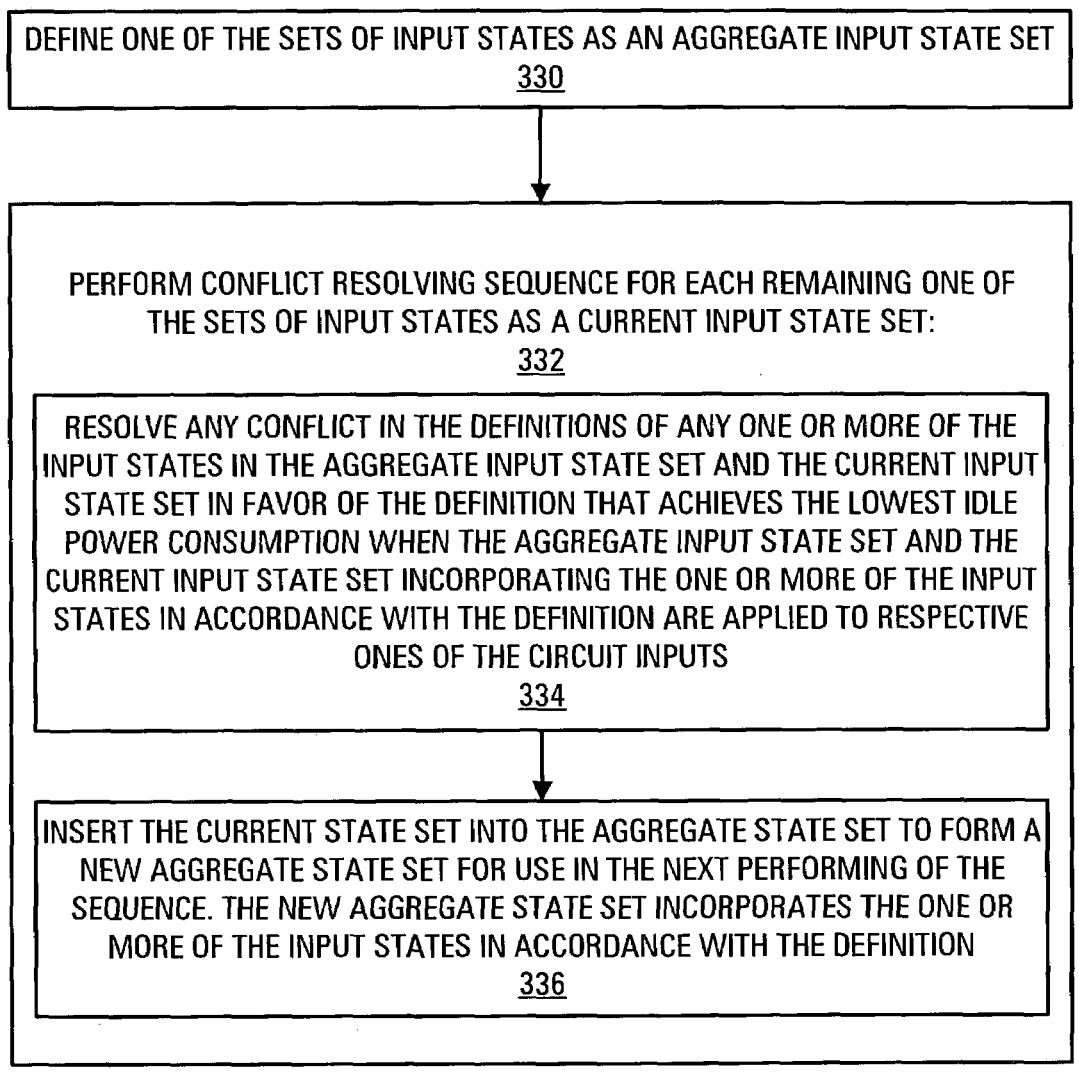
FIG. 10E is a flow diagram illustrating a third exemplary conflict resolution process in accordance with the invention.

The third exemplary conflict resolution process, which is also an embodiment of block 320 shown in FIG. 10A, is illustrated in FIG. 10E. In block 330, one of the sets of input states is defined as an aggregate input state set.

In block 332, a conflict resolving sequence is performed for each one of the remaining sets of input states. The sequence is composed of blocks 334, 336 and 338.

In block 334, any conflict in the definitions of any one or more of the input states in the aggregate input state set and the current input state set is resolved in favor of the definition of the one or more of the input states that achieves the lowest idle power consumption when the current input state set and the aggregate input state set incorporating the one or more of the input states in accordance with the definition are applied to respective ones of the circuit inputs.

In block 336, the current input state set is inserted into the aggregate input state set to form a new aggregate input state set for use in the next (if any) performance of the sequence. The new aggregate input state set incorporates the one or more of the input states in accordance with the definition. The new aggregate input state set formed in the last performance of the sequence is adopted as the input state vector.

In one embodiment, the determinations are all performed prior to the conflict resolution. In an example of this embodiment, the set of input states defined in block 330 as the aggregate input state set is the set of input states defined by the first of the determinations to be performed, and the conflict resolutions performed in block 334 are performed on the input state sets defined by the remaining determinations in the order in which the remaining determinations were performed. However, this is not critical. The set of input states defined as the aggregate input state set in block 330 may be defined by any of the determinations, and the conflict resolution may be performed in any order on the input state sets defined by the remaining determinations. In this case, the idle power consumptions for the different input state vectors defined by the different starting determinations and different orders of performing the conflict resolution may be compared and the input state vector that achieves the lowest idle power consumption adopted as the input state vector.

In another embodiment, conflict resolution is performed after each determination has been performed, except that no conflict resolution is performed after the first-performed determination. In this case, the order of the input state sets on which conflict resolution is performed is determined by the order of performing the determinations.

In an example of the third exemplary conflict resolution process applied to the above-described seven-input circuit modified to include an additional circuit input R and an additional circuit output. The additions to the digital circuit require that an additional determination be performed, making three determinations in all. The first two determinations define sets of input states as above, i.e., a first set of input states composed of input states J, K, L and M defined as 1, 0, 1 and 0, respectively, and a second set of input states composed of input states L, M, N, P and Q defined as 0, 1, 0, 1 and 1, respectively. The third determination defines a third set of input states composed of input states M, N, P and R defined as 1, 1, 1 and 0, respectively.

In block 330, the first set of input states is defined as the aggregate input state set. In block 332, the conflict resolving sequence is performed for each one of the two remaining sets of input states, i.e., the conflict resolving sequence is performed twice in this example. In the first performance of block 334, conflict exists in the definitions of input state L and in the definitions of input state M in the aggregate input state set (i.e., the first set of input states) and the current input state set (i.e., the second set of input states). Such conflict is resolved in favor of the definition that achieves the lower idle power consumption when the current input state set and the aggregate input state set incorporating input states L and M in accordance with the definition are applied to respective ones of the circuit inputs.

In this example, it is assumed that conflict is resolved using the first exemplary conflict resolution procedure described above, and that the definition of the input states L and M in the aggregate input state set (L=1, M=0) achieves the lower idle power consumption. Thus, in the first performance of block 336, the current input state set (i.e., the second set of input states) is inserted into the aggregate input state set (i.e., the first set of input states) to form the new aggregate input state set for use in the next performance of the sequence. The new aggregate input state block incorporates input states L and M as defined in the former aggregate input state block, i.e., as defined by the first determination. Thus, the new aggregate input state set is: J=1, K=0, L=1, M=0, N=0, P=1, Q=1.

One of the sets of input states remains, so execution then returns to block 334, where the third set of input states becomes the current input state set In the second performance of block 334, input states J, K, L and Q are defined without conflict by the aggregate input state set and input state R is defined without conflict by the current input state set. Input state P is defined in both the aggregate input state set and the current input state set, but the definitions do not conflict. Input states M and N are defined in both the aggregate input state set and the current input state set, and the definitions of both these input states conflict. Thus, in the second performance of block 334, conflict in the definitions of input state M and in the definitions of input state N in the aggregate input state set (i.e., the result of inserting the second set of input states into the first set of input states with conflicts resolved) and the current input state set (i.e., the third set of input states) is resolved in favor of the definition that achieves the lowest idle power consumption when the aggregate input state set and the current input state set incorporating the input states M and N in accordance with the definition are applied to respective ones of the circuit inputs.

In an example in which the conflict is resolved using the first exemplary conflict resolution process, idle power consumptions with a first group of input states and with a second group of input states respectively applied to the circuit inputs are calculated. In the first group of input states, input states M and N are as defined in the aggregate input state set. In the second group of input states, input states M and N are as defined in the current input state set. In both the first and the second groups of input states, the remaining input states are those defined without conflict in either or both of the aggregate input state set and the current input state set. The groups of input states are:

First group of input states: JKL MN PQR=101 00 110
Second group of input states: JKL MN PQR=101 11 110

It will be assumed that the first group of input states achieves the lower idle power when applied to the circuit inputs.

In the second performance of block 336, the current input state set is inserted into the aggregate input state set to form a new aggregate input state set for use in the next performance (if any) of the conflict resolution sequence. The new aggregate input state set incorporates input states M and N in accordance with their definition in the former aggregate input state set (i.e., the second set of input states inserted into the first set of input states with any conflicts resolved) that gave the lower idle power consumption in the second performance of block 334. The new aggregate input state set is as follows: J=1, K=0, L=1, M=0, N=0, P=1, Q=1, R=0.

In block 332, no more input state sets remain, so the new aggregate input state set is adopted as the input state vector. Such input state vector will achieve low power consumption when applied to the circuit inputs of the digital circuit in the idle state.

The second exemplary conflict resolution process or another conflict resolution process may be employed instead of the first exemplary conflict resolution process in block 334.

When applied to some digital circuit, all the determinations performed in the method in accordance with the invention may define sets of input states with identical membership. For example, when applied to the digital circuit shown in FIG. 2 or 3 described above, a first determination would define all of the input states of the input state vector, i.e., the input states for application to circuit inputs X, Y, and $C_{in}$. A second determination would also define all of the input states of the input state vector, i.e., the input states for application to circuit inputs X, Y, and $C_{in}$. The exemplary conflict resolution processes described above, or another conflict resolution process, may be used to resolve any conflict in the definitions.

Some embodiments identify conflictingly-defined input states by identifying input states common to two or more of the sets of input states in advance during the segmentation of the digital circuit, and then identify any conflicts in the definitions of the identified input states. Other embodiments identify any conflictingly-defined input states simply by checking the sets of the input states for such input states. Yet other embodiments identify any conflictingly-defined input states in other ways in addition to or instead of the ways just exemplified.

Embodiments may perform a test may on the input states defined by the determinations to detect whether a conflict exists in the definitions of the input states. A detected conflict is resolved as described above. Other embodiments, especially those that identify in advance input states common to two or more of the input state sets, as described above, perform no conflict test on the definitions of such common input states. In this case, the input states subject to the conflict resolution process include common input states in whose definitions no conflict exists. Including such common input states makes no difference to the outcome provided by the first exemplary conflict resolution process described above, but increases the complexity and can change the outcome of the second exemplary conflict resolution process described above. An inability to detect a lower power consumption indicates that the calculated power consumptions are equal and that all the determinations have provided the same definition of the common input states. Yet other embodiments detect conflicts in the definitions of the common input states in ways other than those exemplified above.

Figure 12:
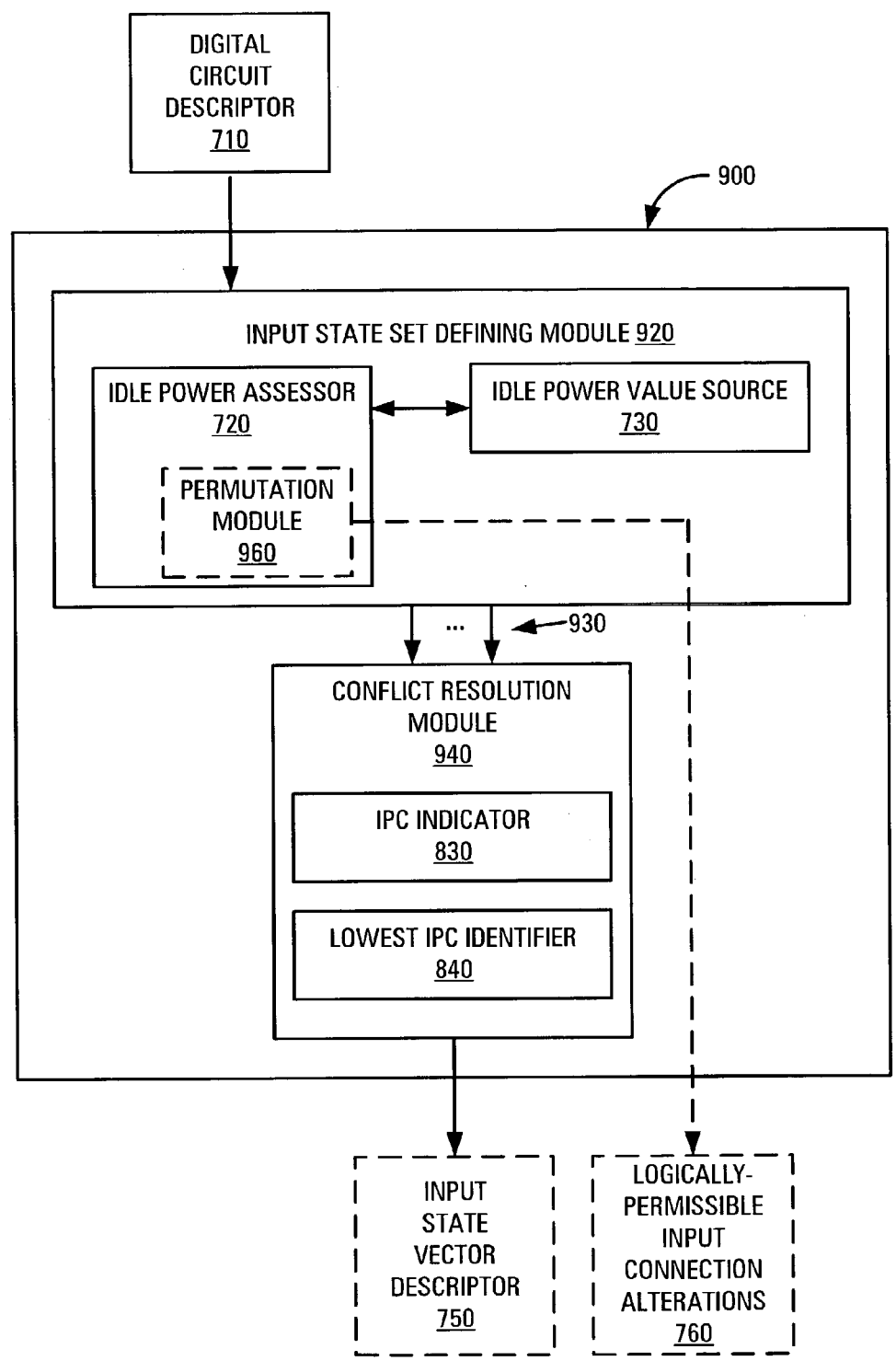
FIG. 12 is a block diagram of an embodiment of an apparatus in accordance with the invention for defining an input state vector by performing independent determinations that define respective sets of the input states of the input state vector.

FIG. 12 is a block diagram of an exemplary embodiment 900 of an apparatus in accordance with the invention for defining an input state vector that achieves low power consumption when applied to the circuit inputs of a digital circuit in an idle state. Elements of apparatus 900 that correspond to elements of apparatus 700 described above with reference to FIGS. 7 and 8 are indicated using the same reference numerals and will not be described in detail.

Apparatus 900 receives a digital circuit descriptor 710 representing the digital circuit. Such a digital circuit descriptor 710 can be, for example, computer code representing the digital circuit. Apparatus 900 generates an input state vector descriptor 750 that defines an input state vector that achieves low power consumption when applied to the circuit inputs of the digital circuit described by the digital circuit descriptor when the digital circuit in an idle state.

Apparatus 900 is composed of an input state set defining module 920 and a conflict resolution module 940. Input state set defining module 920 is operable to perform independent determinations, each defining a respective set of the input states of the input state vector. In an exemplary embodiment, the input state set defining module performs a first determination that defines a first set of the input states of the input state vector, and performs a second determination that defines a second set of the input states of the input state vector. The second determination is independent of the first determination.

The embodiment of input state set determining module 920 shown includes an idle power assessor 720, an idle power value source 730 and an optional permutation module 960. Idle power value source 730 includes memory capable of storing idle power values for the different circuit element types of the circuit elements that comprise the digital circuit. The idle power values for each circuit element type correspond to different states of the inputs of a circuit element of the circuit element type. In one embodiment, idle power value source 730 is structured as a look-up table. Idle power value source 730 may be integral with apparatus 900 as shown. Alternatively, idle power value source 730 may be located remotely from apparatus 900 and coupled to apparatus 900 by a communication link. As mentioned above, the idle power values stored in idle power value source 730 for a given circuit element type may be static idle power values, dynamic idle power values or a combination of static idle power values and dynamic idle power values.

Embodiments of input state set defining module 920 operate in response to digital circuit descriptor 710 to specify the number of determinations and the type of determinations that will be performed to define the respective sets of the input states. The input state set defining module may additionally specify any segmentation of the digital circuit. In other embodiments, the number of determinations and their type or types are predetermined. In yet other embodiments, the number of determinations, the type or types of the determinations and the segmentation, if any, of the digital circuit are supplied to input state set defining module 920 from an external source. For example, such information may be supplied as part of digital circuit descriptor 710.

Idle power assessor 720 operates to perform each of the determinations specified by input state set defining module 920. Each of the determinations defines a respective set of the input states of the input state vector. In response to digital circuit descriptor 710 and the determination specifications provided by the input state determining module, idle power assessor 720 accesses the idle power values stored in idle power value source 730 and, for each circuit element in the segment of the digital circuit subject to the determination currently being performed, uses the stored idle power values for the circuit element type of the circuit element to define states of the inputs of the circuit element that would set the circuit element to a lowest-allowable idle power state when the digital circuit is in an idle state. The input states determined for the circuit elements whose inputs constitute the circuit inputs of the segment of the digital circuit subject to the determination constitute the respective set of the input states of the input state vector.

In performing each determination, idle power assessor 720 accounts for the logic constraints of the segment of the digital circuit subject to the determination. Input states defined earlier in a given determination constitute logical constraints, but the logical constraints extend only to the given determination. The input states are defined by each determination independently of, and without concern for, the input states defined by any other determination or determinations.

Input state set defining module 920 outputs input state set descriptors 930, each of which represents the input state set defined by a respective one of the determinations performed by idle power assessor 720.

Conflict resolution module 940 is coupled to receive input state set descriptors 930 output by input state set defining module 920. The conflict resolution module is operable to resolve any conflict in the definitions by the determinations performed by the input state set defining module of any one or more of the input states. The conflict resolving module resolves such conflict in favor of the definition of the one or more of the inputs state that achieves the lower idle power consumption when the input state vector incorporating the one or more of the input states in accordance with the definition is applied to the circuit inputs of the digital circuit in the idle state.

The example of conflict resolution module 940 shown includes an idle power consumption (IPC) indicator 830 and a lower idle power consumption identifier 840. An exemplary embodiment of idle power consumption indicator 830 is configured to indicate an idle power consumption achieved by applying an input state vector incorporating each of the conflicting definitions of the one or more of the input states to the circuit inputs of the digital circuit in the idle state.

Lowest idle power identifier 840 is configured to identify the lowest of the idle power consumptions indicated by the idle power consumption indicator 830.

Based on the result provided by lowest idle power identifier 840, conflict resolution module 940 resolves any conflict in the definitions of the input states by two or more of the determinations performed by input state set defining module in favor of the definition of such input states that achieves the lowest idle power consumption when the input state vector incorporating the input states in accordance with the definition is applied to the circuit inputs of the digital circuit in the idle state.

Conflict resolution module 940 outputs an input state vector descriptor that describes the input state vector defined by apparatus 900.

As noted above, the embodiment of idle power assessor 720 shown in FIG. 12 may additionally include an optional permutation module 960 that identifies logically-permissible input connection alterations applicable to at least one of the circuit elements of the digital circuit. Input state set defining module 920 defines sets of the input states of the input state vector in response to a received digital circuit descriptor 710. The digital circuit descriptor may take the form of a computer code representation of the digital circuit generated by software sold under the trademark VERILOG® or VHDL®, or generated by software known as SPICE, for example. Once each input state set has been defined, permutation module 960 identifies an logically-permissible input connection alteration that could be made to each of one or more of the circuit elements of the segment of the digital circuit to which the determination that resulted in the input state set was applied. The logically-permissible input connection alteration reduces the idle power consumption when the input state set is applied to the respective circuit inputs of the digital circuit in the idle state.

Any logically-permissible input connection alteration identified by permutation module 960 can be implemented in the digital circuit before the digital circuit is physically fabricated. Such logically-permissible input connection alterations will reduce the idle power consumption of the digital circuit in the idle state when the input state vector is applied to the circuit inputs relative to the idle power consumption of the digital circuit without such logically-permissible input connection alterations.

Permutation module 960 generates a logically-permissible input connection alterations descriptor 760 that identifies a logically-permissible input connection alteration for each of the circuit elements for which a logically-permissible input connection alteration has been identified. The logically-permissible input connection alteration is an alteration of the input connections of the circuit element that can be applied without changing the logic of the digital circuit.

As described above with reference to FIGS. 5, 6A and 6B, logically-permissible input connection alterations of the physical inputs of a circuit element in a digital circuit can be implemented when the circuit element has different physical input connection arrangements that are logically equivalent.

Embodiments of apparatus 900 may be constructed from one or more of discrete components, small-scale or large-scale integrated circuits, suitably-configured application-specific integrated circuits (ASICs) and other suitable hardware. Alternatively, embodiments of the apparatus and the modules thereof may be constructed using a digital signal processor (DSP), microprocessor, microcomputer, computer or other programmable device with internal or external memory operating in response to an input state vector defining program fixed in a computer-readable medium in accordance with the invention. A programmable device, such as a DSP, a microprocessor, microcomputer or computer, capable of executing an input state vector defining program will be referred to herein as a computer.

In computer-based embodiments of apparatus 900, one or more of the modules described above may be ephemeral, and may only exist temporarily as the input state vector defining program executes. In such embodiments, the input state vector defining program could be conveyed to the computer on which it is to run by embodying the program in a suitable computer-readable medium, such as a set of floppy disks, a CD-ROM, a DVD-ROM or a non-volatile memory device. Alternatively, the input state vector defining program could be transmitted to such computer by a suitable data link and be stored in a memory device in the computer.

The input state vector defining program causes the computer on which it runs to perform a method for defining an input state vector that achieves low power consumption when applied to the circuit inputs of a digital circuit in an idle state. The methods performed by the computer in response to the input state vector defining program are substantially similar to those described above with reference to FIGS. 10A–10E and 11A–11D.

A digital circuit for which embodiments in accordance with the invention define respective input state vectors may incorporate circuit elements such as, for example, flip-flops, to apply the input state vector to the circuit inputs of the digital circuit in the idle state. A description of the use of such circuit elements to apply the input state vector to the circuit elements is set forth above in with reference to FIG. 9. Circuit elements such as flip-flops can also be used to apply the input state vector defined by embodiments of the method and apparatus described above with reference to FIGS. 10A, 10B, 11A–11D and 12.

Embodiments in accordance with the invention perform independent determinations that define respective sets of the input states of the input state vector. The sets of input states collectively constitute the input state vector. Embodiments in accordance with the invention also resolve any conflict in the definitions by two or more of the determinations of any one or more of the input states in favor of the definition of the one or more of the input states that achieves the lowest idle power consumption when the input state vector that incorporates the one or more of the input states in accordance with the definition is applied to the circuit inputs of the digital circuit in the idle state.

This disclosure describes the invention in detail using illustrative embodiments. However, it is to be understood that the invention defined by the appended claims is not limited to the precise embodiments described.

We claim:

1. Apparatus for defining an input state vector for application to the circuit inputs of a digital circuit to achieve low power when said digital circuit is in an idle state, the apparatus comprising:

an input state set defining module operable to perform independent determinations defining respective sets of the input states of said input state vector; and a conflict resolving module operable to resolve any conflict in the definitions of any one or more of said input states in favor of a definition of said one or more of said input states that achieves the lowest power consumption when said input state vector comprising said one or more of said input states in accordance with said definition is applied to the circuit inputs of said digital circuit in said idle state.

2. The apparatus of claim 1, in which:

said digital circuit comprises one or more circuit elements of respective circuit element types; and said input state vector defining module comprises:

an idle power value source having idle power values stored therein, said idle power values including idle power values for each one of said circuit element types, said idle power values for said one of said circuit element types corresponding to different states of the inputs of a circuit element of said one of said circuit element types, and an idle power assessor coupled to said idle power value source, said idle power assessor operable during each determination to use said idle power values to determine, for each one of said circuit elements of a segment of said digital circuit subject to said determination, states of the inputs of said one of said circuit elements that would set said one of said circuit elements to a lowest-allowable idle power state when said digital circuit is in said idle state, said determining accounting for the logic constraints of said segment of said digital circuit, said states determined for ones of said inputs that constitute respective ones of said circuit inputs defining said respective set of said input states.

3. The apparatus of claim 1, in which:

said input state set defining module is operable to perform:

a first determination defining first ones of said input states, said first ones of said input states constituting a first set of the input states of said input state vector, and a second determination, independent of said first determination, defining second ones of said input states, said second ones of said input states constituting a second set of the input states of said input state vector, said second determination and said first determination providing conflicting definitions of one of said input states; and said conflict resolution module is operable to resolve said conflict in said definitions of said one of said input states in favor of the definition of said one of said input states that achieves the lower idle power consumption when said input state vector comprising said one of said input states in accordance with said definition is applied to said circuit inputs.

4. The apparatus of claim 1, in which said input state set defining module is additionally operable to divide said digital circuit into segments and to perform each of said determinations on a different one of said segments.

5. The apparatus of claim 1, in which said conflict resolving module is operable to resolve said any conflict in the definitions of at least two of said input states in favor of the combination of said at least two of said input states that achieves the lowest idle power consumption when said input state vector comprising said at least two of said input states in accordance with said combination is applied to said circuit inputs.

6. The apparatus of claim 1, in which said conflict resolving module is operable to resolve said any conflict in the definitions of said one or more of said input states in favor of the definition of said one or more of said input states that achieves the lowest idle power consumption when said input state vector comprising said one or more input states in accordance with said definition is applied to said circuit inputs.

7. The apparatus of claim 1, in which said conflict resolving module is operable to resolve said any conflict in the definition of said one of more of said input states by a process comprising:
  defining said one of said sets of input states as an aggregate input state set; and
  performing, for each remaining one of said sets of input states as a current input state set, a sequence comprising:
    resolving any conflict in the definitions of any one or more of the input states in said aggregate input state set and said current input state set in favor of the definition that achieves the lowest idle power consumption when said current input state set and said aggregate input state set comprising said one or more of said input states in accordance with said definition are applied to respective ones of said circuit inputs, and
    inserting said current state set into said aggregate state set to form a new aggregate input state set for use in the next performing of said sequence, said new aggregate input state set comprising said one or more of said input states in accordance with said definition.

8. The apparatus of claim 1, in which said conflict resolution module comprises:
  an idle power consumption indicator coupled to said input state set determining module and configured to indicate respective idle power consumptions respectively achieved by applying possible input state vectors each comprising said one or more of said input states in accordance with a different one of said definitions to said circuit inputs; and
  a lower idle power consumption identifier coupled to said idle power consumption indicator and configured to identify the lowest of said idle power consumptions and the corresponding definition of said one or more of said input states.

9. The apparatus of claim 1, in which:
  said digital circuit comprises one or more circuit elements of respective circuit element types; and
  said idle power assessor comprises a permutation module configured to identify a logically-permissible input connection alteration applicable to each of one or more of said circuit elements, said logically-permissible input connection alteration reducing said lowest-allowable idle power state of said circuit element when said digital circuit is in said idle state.

10. A method for defining an input state vector for application to the circuit inputs of a digital circuit to achieve low power consumption when said digital circuit is in an idle state, said method comprising:
  performing independent determinations each defining a respective set of the input states of said input state vector; and
  resolving any conflict in the definitions of any one or more of said input states in favor of a definition of said one or more of said input states that achieves the lowest idle power consumption when said input state vector comprising said one or more of said input states in accordance with said definition is applied to said circuit inputs of said digital circuit in said idle state.

11. The method of claim 10, in which:
said digital circuit comprises one or more circuit elements of respective circuit element types;
the method additionally comprises accessing stored idle power values including idle power values for each said circuit element type, said idle power values for said circuit element type corresponding to different states of the inputs of a circuit element of said circuit element type; and
in said performing, each said determination comprises determining from said stored idle power values, for each said circuit element in the segment of said digital circuit subject to said determination, states of the inputs of said circuit element that would set said circuit element to a lowest-allowable idle power state when said digital circuit is in said idle state, said determining accounting for logic constraints of said segment of said digital circuit, said states determined for ones of said inputs that constitute respective ones of said circuit inputs defining said respective set of said input states.

12. The method of claim 10, in which:
said performing comprises:
  performing a first determination defining first ones of said input states, said first ones of said input states constituting a first set of said input states of said input state vector, and
  performing a second determination, independent of said first determination, defining second ones of said input states, said second ones of said input states constituting a second set of said input states of said input state vector, said second determination and said first determination providing conflicting definitions of one of said input states; and
said resolving comprises resolving said conflict in said definitions of said one of said input states in favor of the definition of said one of said input states that achieves the lower idle power consumption when said input state vector comprising said one of said input states in accordance with said definition is applied to said circuit inputs.

13. The method of claim 10, in which:
said method additionally comprises dividing said digital circuit into segments; and
said performing comprises performing said determinations on different ones of said segments.

14. The method of claim 10, wherein said segments comprise fan-in cones.

15. The method of claim 10, in which said resolving comprises:
  indicating respective idle power consumptions achieved by applying possible input state vectors each comprising said one or more of said input states in accordance with a different one of said definitions to said circuit inputs; and
  identifying the lowest of said idle power consumptions and the corresponding definition of said one or more of said input states.

16. The method of claim 10, in which:
said digital circuit comprises one or more circuit elements of respective circuit element types; and said method additionally comprises identifying a logically-permissible input connection applicable to each of one or more of said circuit elements, said logically-permissible input connection alteration reducing said lowest-allowable idle power state of said circuit element when said digital circuit is in said idle state.

17. The method of claim 10, in which:
in said performing, conflict exists in the definitions of no more than one of said input states; and
said resolving comprises resolving said conflict in the definition of said one of said input states in favor of the definition of said one of said input states that achieves the lower power consumption when said input state vector comprising said one of said input states in accordance with said definition is applied to said circuit inputs.

18. The method of claim 10, in which said resolving comprises resolving said any conflict in the definitions of at least two of said input states in favor of the combination of said at least two of said input states that achieves the lowest idle power consumption when said input state vector comprising said at least two of said input states in accordance with said combination is applied to said circuit inputs.

19. The method of claim 10, in which said resolving comprises resolving said any conflict in the definitions of said one or more of said input states in favor of the definition of said one or more of said input states that achieves the lowest idle power consumption when said input state vector comprising said one or more input states in accordance with said definition is applied to said circuit inputs.

20. The method of claim 10, in which said resolving comprises:
defining said one of said sets of input states as an aggregate input state set; and
performing, for each remaining one of said sets of input states as a current input state set, a sequence comprising:
resolving any conflict in the definitions of any one or more of the input states in said aggregate input state set and said current input state set in favor of the definition that achieves the lowest idle power consumption when said current input state set and said aggregate input state set comprising said one or more of said input states in accordance with said definition are applied to respective ones of said circuit inputs, and
inserting said current state set into said aggregate state set to form a new aggregate input state set for use in the next performing of said sequence, said new aggregate input state set comprising said one or more of said input states in accordance with said definition.

21. The method of claim 20, in which
said one of said sets of input states is defined by a first-performed one of said determinations; and
said sequence is performed on each of said remaining ones of said sets of input states in the order in which the determinations that defined said ones of said remaining ones were performed.

22. The method of claim 20, in which said resolving said any conflict in said definitions of said one or more of said input states in said current input state set and said aggregate input state set comprises resolving said conflict in favor of the combination of said one or more of said input states that achieves the lowest idle power consumption when said current state set and said aggregate state set comprising said one or more of said input states in accordance with said combination are applied to said circuit inputs.

23. The method of claim 20, in which said resolving said any conflict in said definitions of said one or more input states in said current input state set and said previous input state set comprises resolving said conflict in favor of the definition of said one or more of said input states that achieves the lowest idle power consumption when said current state set and said aggregate state set comprising said one or more input states in accordance with said definition are applied to said circuit inputs.

24. A computer-readable medium having stored thereon computer-readable instructions for causing a computer to perform a method for defining an input state vector for application to the circuit inputs of a digital circuit to achieve low power consumption when said digital circuit is in an idle state, said method comprising:
performing independent determinations each defining a respective set of the input states of said input state vector; and
resolving any conflict in the definitions of any one or more of said input states in favor of a definition of said one or more of said input states that achieves the lowest idle power consumption when said input state vector comprising said one or more of said input states in accordance with said definition is applied to said circuit inputs of said digital circuit in said idle state.

25. The computer-readable medium of claim 24, in which:
said digital circuit comprises one or more circuit elements of respective circuit element types;
said method additionally comprises accessing stored idle power values including idle power values for each one of said circuit element types, said idle power values for said one of said circuit element types corresponding to different states of the inputs of a circuit element of said one of said circuit element types; and
in said performing, each said determination comprises determining from said stored idle power values, for each said circuit element in the segment of said digital circuit subject to said determination, states of the inputs of said circuit element that would set said circuit element to a lowest-allowable idle power state when said digital circuit is in said idle state, said determining accounting for logic constraints of said segment of said digital circuit, said states determined for ones of said inputs that constitute respective ones of said circuit inputs defining said respective set of said input states.

26. The computer-readable medium of claim 24, in which:
said performing comprises:
performing a first determination defining first ones of said input states, said first ones of said input states constituting a first set of said input states of said input state vector, and
performing a second determination, independent of said first determination, defining second ones of said input states, said second ones of said input states constituting a second set of said input states of said input state vector, said second determination and said first determination providing conflicting definitions of one of said input states; and
said resolving comprises resolving said conflict in the definitions of said one of said input states in favor of the definition of said one of said input states that achieves the lower power consumption when said input state vector comprising said one of said input states in accordance with said definition is applied to said circuit inputs.

27. The computer-readable medium of claim 24, in which:
said method additionally comprises dividing said digital circuit into segments; and
said performing comprises performing said determinations on different ones of said segments.

28. The computer-readable medium of claim 27, wherein said segments are fan-in cones.

29. The computer-readable medium of claim 24, in which said resolving comprises resolving said any conflict in the definitions of at least two of said input states in favor of the combination of said at least two of said input states that achieves the lowest idle power consumption when said input state vector comprising said at least two of said input states in accordance with said combination is applied to said circuit inputs.

30. The computer-readable medium of claim 24, in which said resolving comprises resolving said any conflict in the definitions of said one or more of said input states in favor of the definition of said one or more of said input states that achieves the lowest idle power consumption when said input state vector comprising said one or more input states in accordance with said definition is applied to said circuit inputs.

31. The computer-readable medium of claim 24, in which said resolving comprises:
defining said one of said sets of input states as an aggregate input state set; and
performing, for each remaining one of said sets of input states as a current input state set, a sequence comprising:
resolving any conflict in the definitions of any one or more of the input states in said aggregate input state set and said current input state set in favor of the definition that achieves the lowest idle power consumption when said current input state set and said aggregate input state set comprising said one or more of said input states in accordance with said definition are applied to respective ones of said circuit inputs, and
inserting said current state set into said aggregate state set to form a new aggregate input state set for use in the next performing of said sequence, said new aggregate input state set comprising said one or more of said input states in accordance with said definition.

32. The computer-readable medium of claim 24, in which said resolving comprises:
indicating respective idle power consumptions respectively achieved by applying possible input state vectors each comprising said one or more of said input states in accordance with a different one of said definitions to said circuit inputs; and
identifying the lowest of said idle power consumptions and the corresponding definition of said one or more of said input states.

33. The computer-readable medium of claim 24, in which:
said digital circuit comprises one or more circuit elements of respective circuit element types; and
said method additionally comprises identifying a logically-permissible input connection applicable to each of one or more of said circuit elements, said logically-permissible input connection alteration reducing said lowest-allowable idle power state of said circuit element when said digital circuit is in said idle state.

* * * * *